United States Patent
Matthews et al.

(10) Patent No.: US 9,245,176 B2
(45) Date of Patent: Jan. 26, 2016

(54) CONTENT RETARGETING USING FACIAL LAYERS

(75) Inventors: Iain Matthews, Pittsburgh, PA (US); Natasha Kholgade, Pittsburgh, PA (US); Yaser Sheikh, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 219 days.

(21) Appl. No.: 13/564,476

(22) Filed: Aug. 1, 2012

(65) Prior Publication Data

US 2014/0035929 A1 Feb. 6, 2014

(51) Int. Cl.
*G06K 9/00* (2006.01)
*G06T 13/40* (2011.01)
*G06T 17/20* (2006.01)

(52) U.S. Cl.
CPC ........... *G06K 9/00315* (2013.01); *G06T 13/40* (2013.01); *G06T 17/20* (2013.01)

(58) Field of Classification Search
CPC combination set(s) only.
See application file for complete search history.

(56) References Cited

U.S. PATENT DOCUMENTS

| | | | |
|---|---|---|---|
| 8,941,665 B1 * | 1/2015 | Sullivan et al. | 345/473 |
| 2008/0024505 A1 * | 1/2008 | Gordon et al. | 345/473 |
| 2010/0045680 A1 * | 2/2010 | Havaldar et al. | 345/473 |

* cited by examiner

*Primary Examiner* — Zhengxi Liu
(74) *Attorney, Agent, or Firm* — Patterson + Sheridan, LLP

(57) ABSTRACT

Techniques are disclosed for retargeting facial expressions. Input is received that represents a facial expression of a first character. Facial layers are generated based on the received input. The facial layers include one or more parameters extracted from the received input. A facial expression for a second character and corresponding to the facial expression of the first character is generated, based on the facial layers and without defining any spatial correspondence between the first character and the second character.

24 Claims, 13 Drawing Sheets
(9 of 13 Drawing Sheet(s) Filed in Color)

CONTENT RETARGETING USING FACIAL LAYERS

BACKGROUND

Animation systems present animated characters in a three-dimensional virtual space. The virtual space includes a collection of mathematical models that define various objects, characters, scenery elements and the like, that can interact with each other. The animated characters move by programmatic changes in various parameters of the mathematical models. The virtual space is rendered, that is, converted from a mathematical model to a visual representation suitable for viewing by a user, and presented on a display to a viewer. Interactive animation can involve game players who control animated characters. Other animated characters may be programmatically controlled. Such characters can often mimic reality by showing awareness of other characters and objects in the virtual space. Further, certain classes of characters may have the ability to look at objects, aim at objects, attack objects, or otherwise interact with objects in the three dimensional virtual space.

SUMMARY

Embodiments of the invention provide a computer-implemented method, computer program product and system to perform an operation to retarget facial expressions by providing a parameter-parallel retargeting space between an input facial expression and an output facial expression and via facial layers. The operation includes receiving input representing a facial expression of a first character. The operation further includes generating facial layers for the first character, based on the received input. The facial layers include one or more parameters extracted from the received input. The operation further includes generating a facial expression for a second character and corresponding to the facial expression of the first character, based on the facial layers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
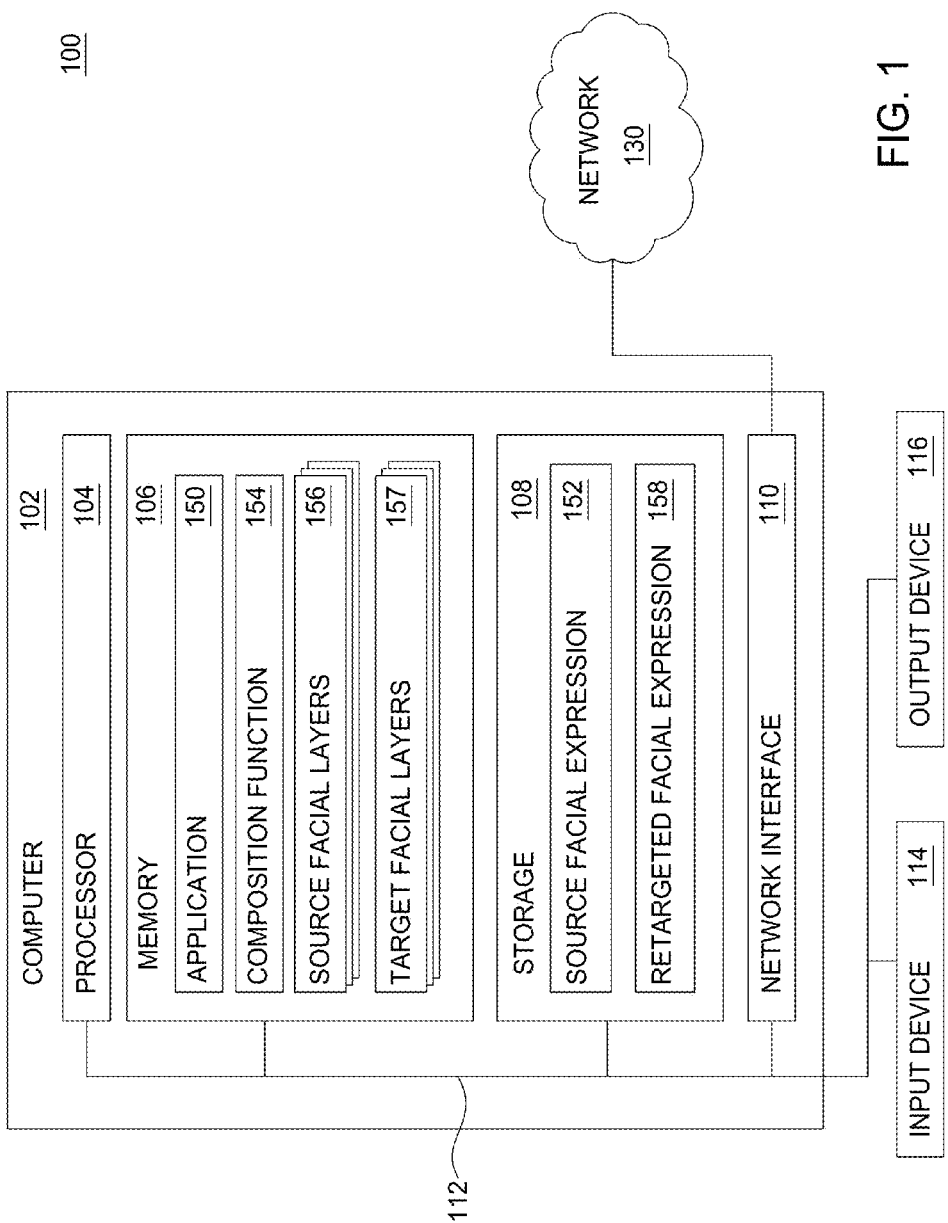

FIG. 1 is a block diagram illustrating a system to retarget facial expressions, according to one embodiment of the invention.

Figure 2:
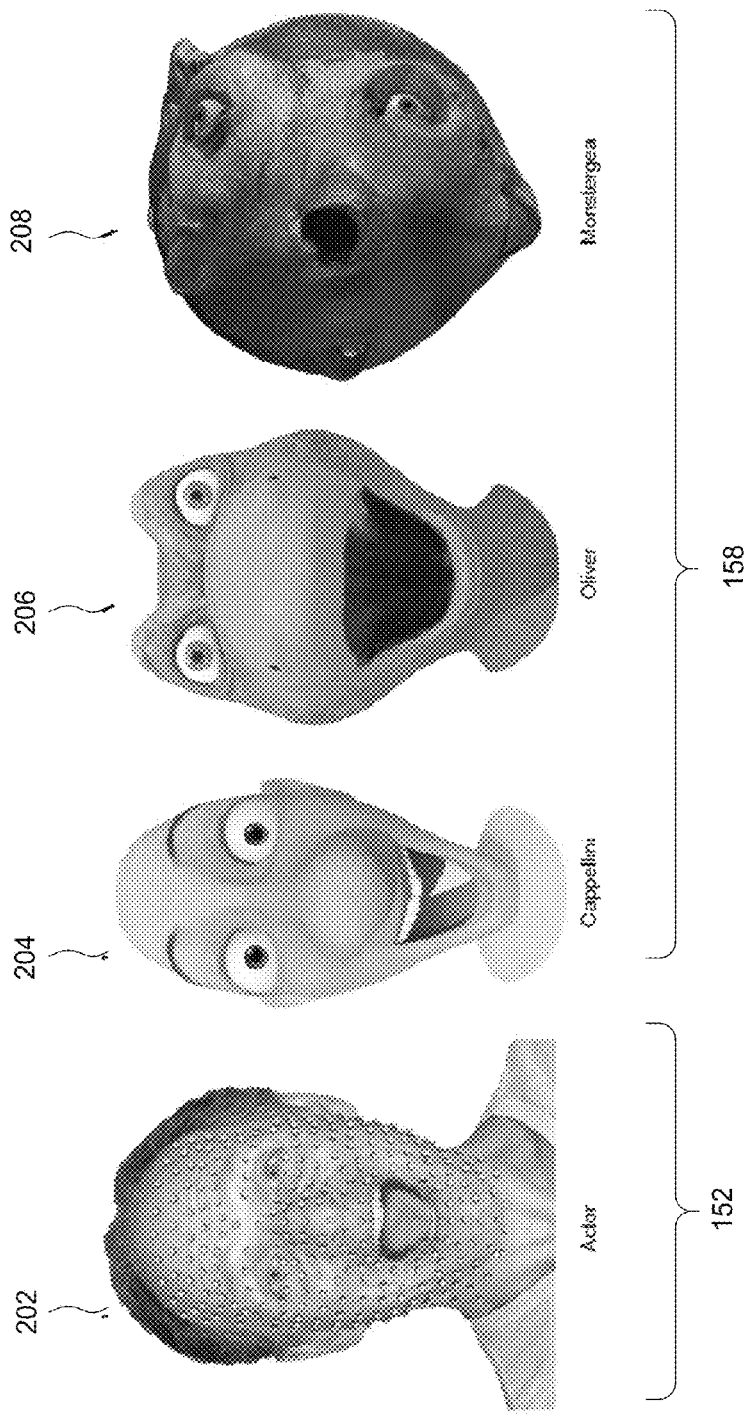

FIG. 2 illustrates examples of source and retargeted facial expressions, according to one embodiment of the invention.

Figure 3:
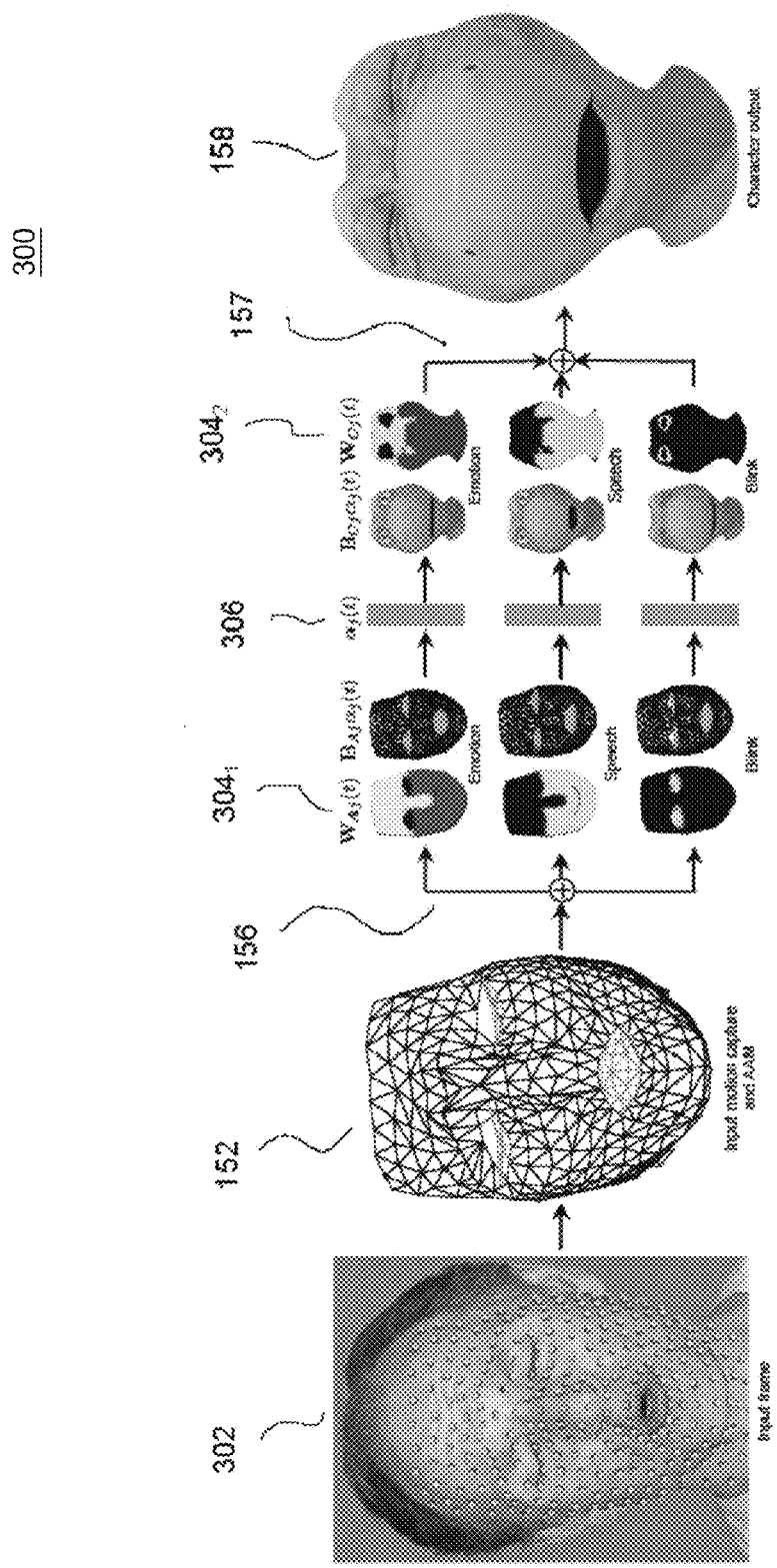

FIG. 3 is a visual depiction of a technique for retargeting a source facial expression, according to one embodiment of the invention.

Figure 4:
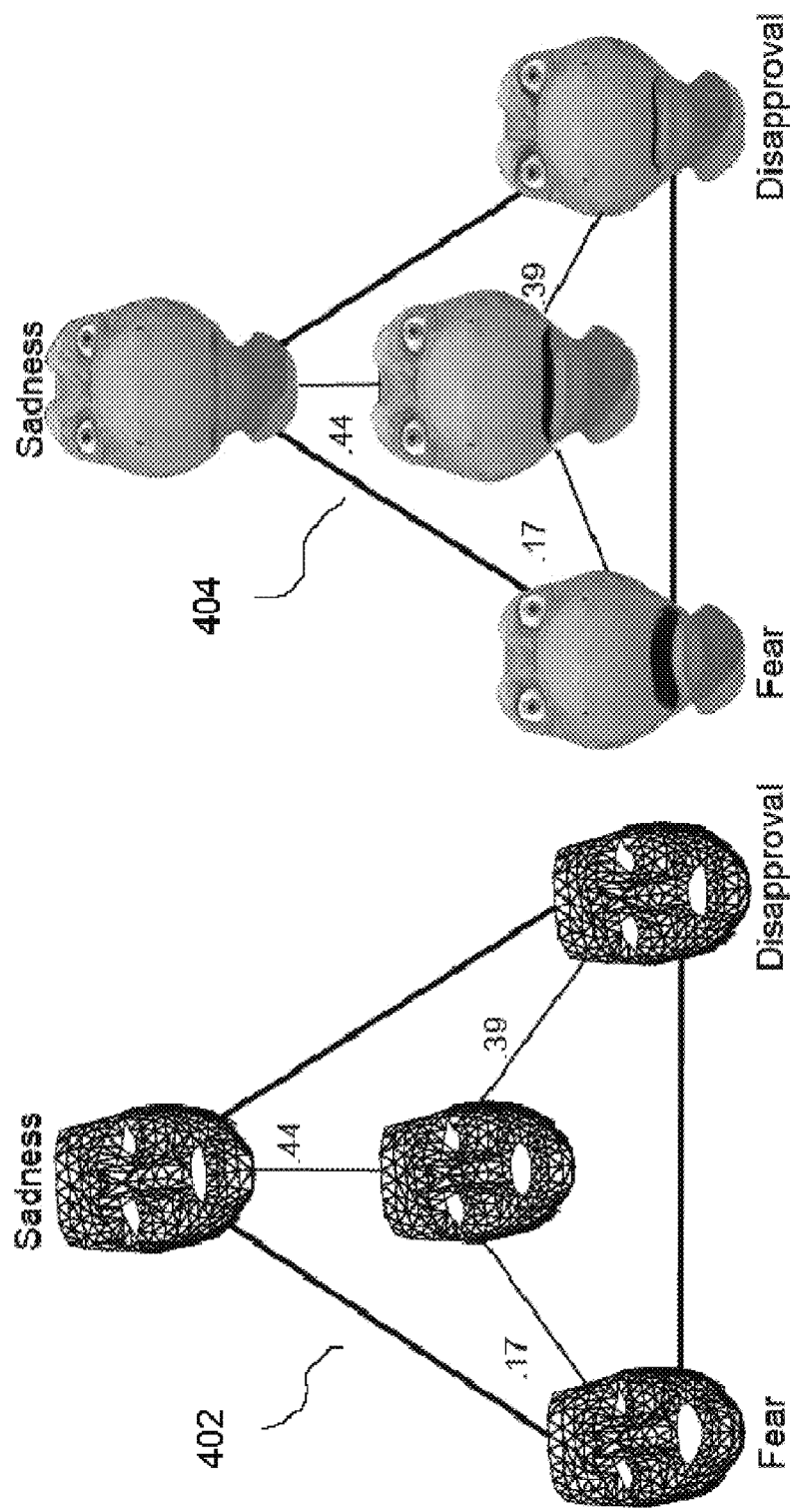

FIG. 4 illustrates examples of simplicial bases for source and target emotion layers, according to one embodiment of the invention.

Figure 5:
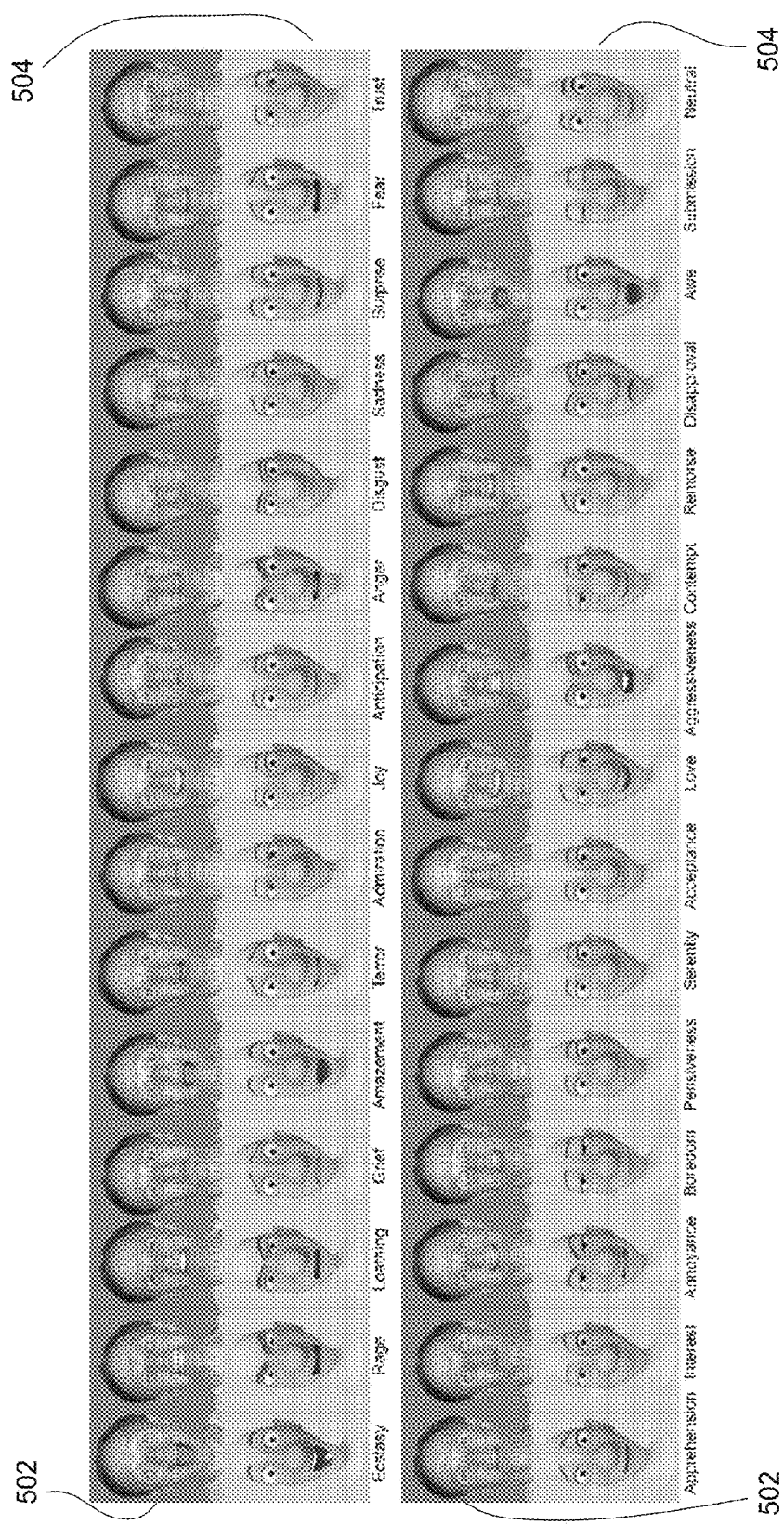

FIG. 5 illustrates source and target facial expressions for a set of emotions, according to one embodiment of the invention.

Figure 6:
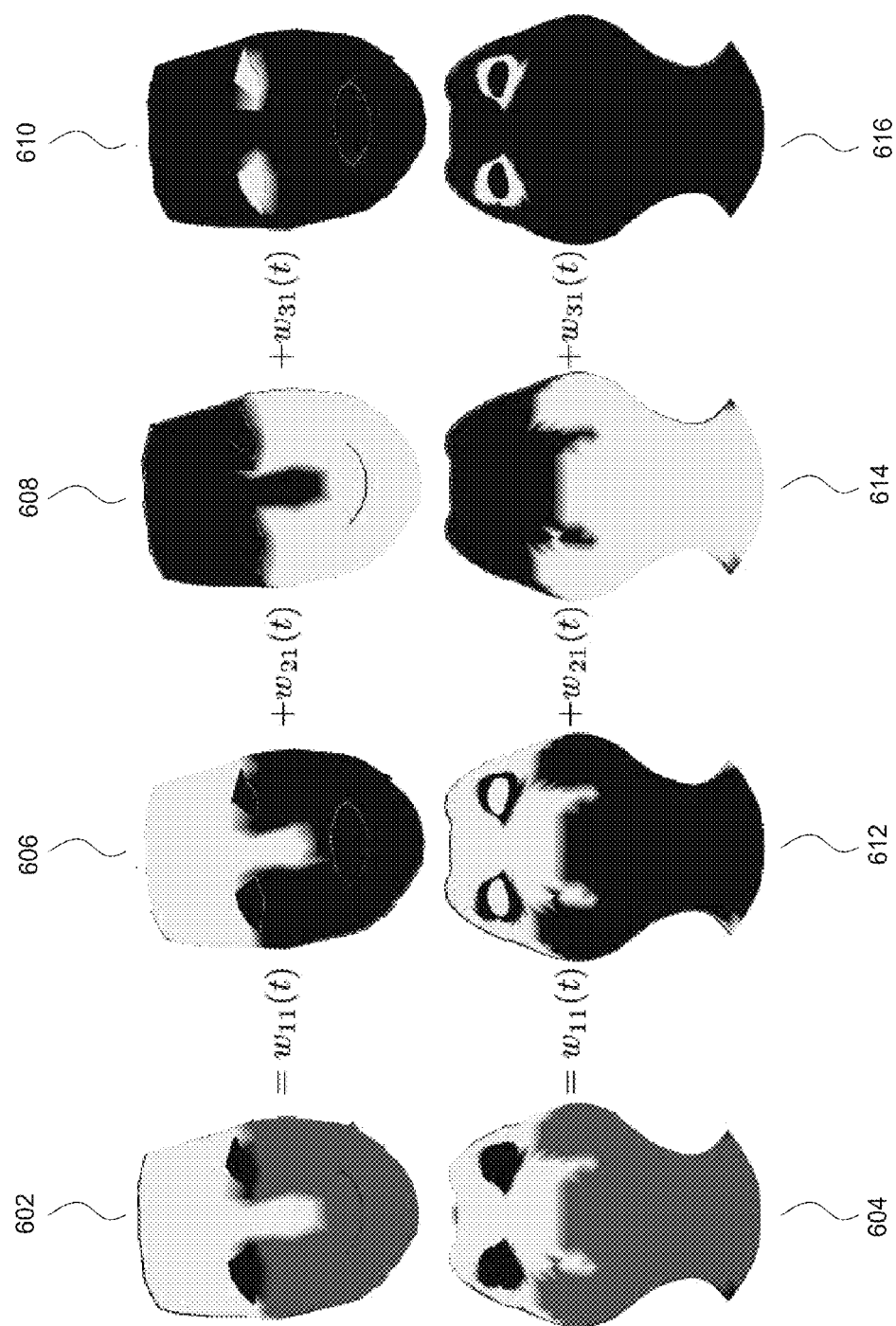

FIG. 6 illustrates weighted masks and associated component masks, according to one embodiment of the invention.

Figure 7:
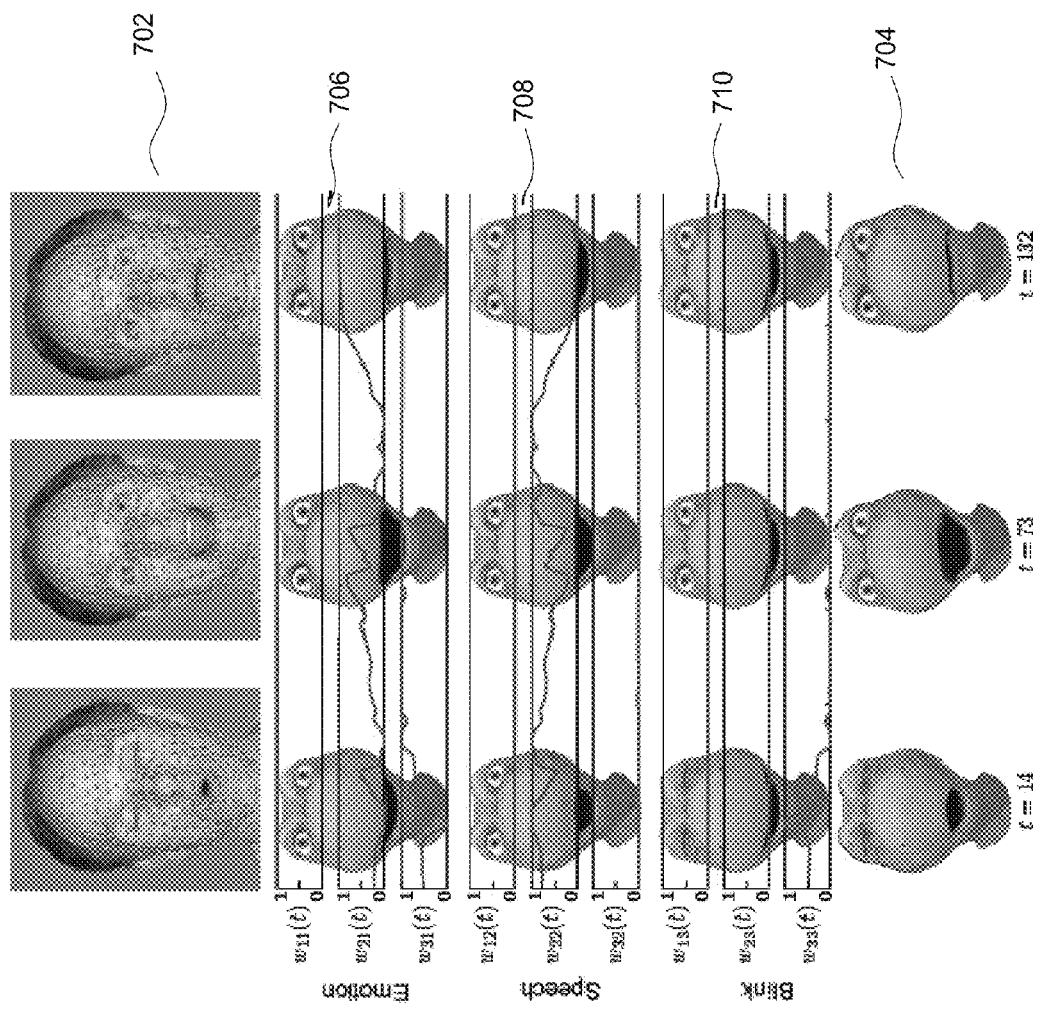

FIG. 7 illustrates frame sequences for the emotion of anger, according to one embodiment of the invention.

Figure 8:
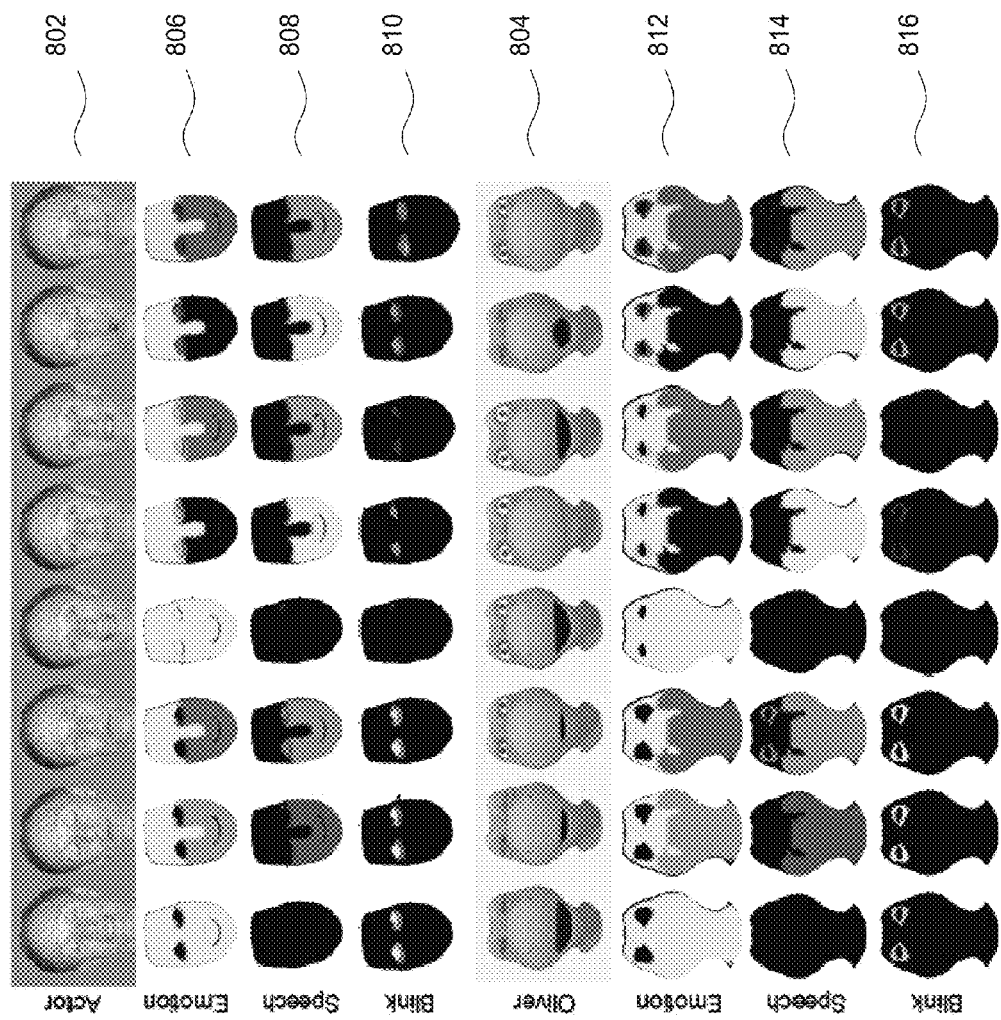

FIG. 8 shows time-varying weighted masks for the emotion of guilt, according to one embodiment of the invention.

Figure 9:
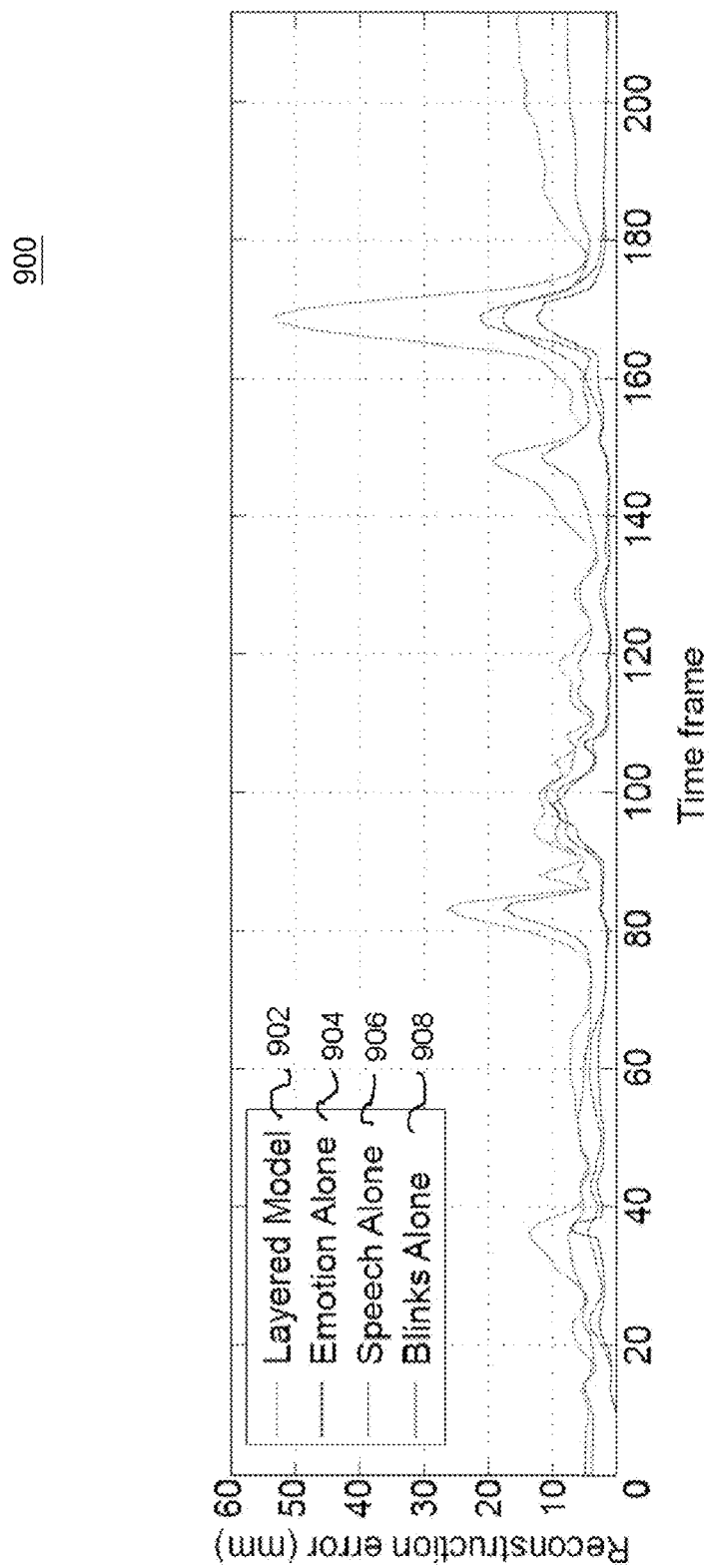

FIG. 9 is a graph depicting measures of root mean square reconstruction errors, according to one embodiment of the invention.

Figure 10:
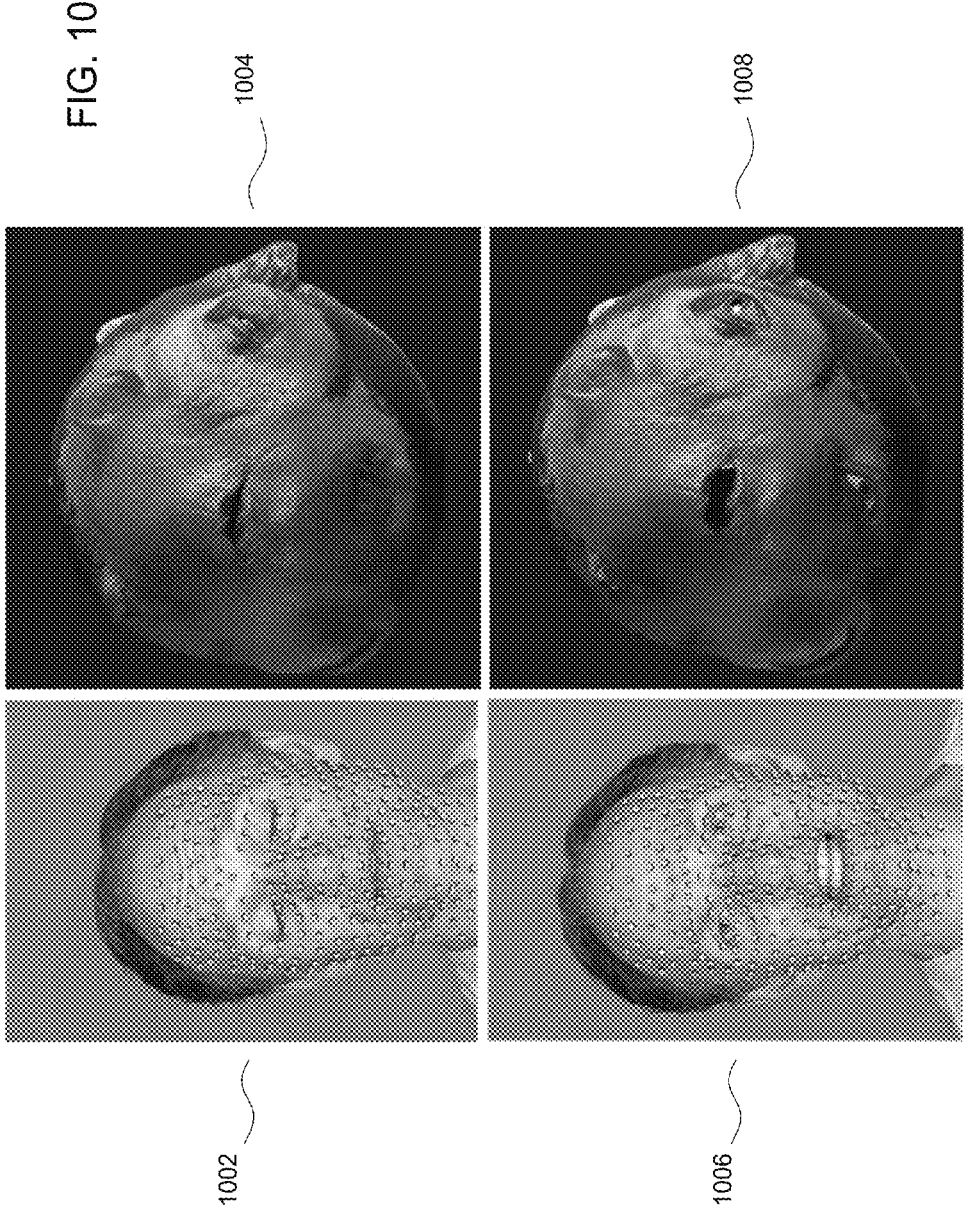

FIG. 10 illustrates input and output frames associated with retargeting a facial expression to a single target character, according to one embodiment of the invention.

Figure 11:
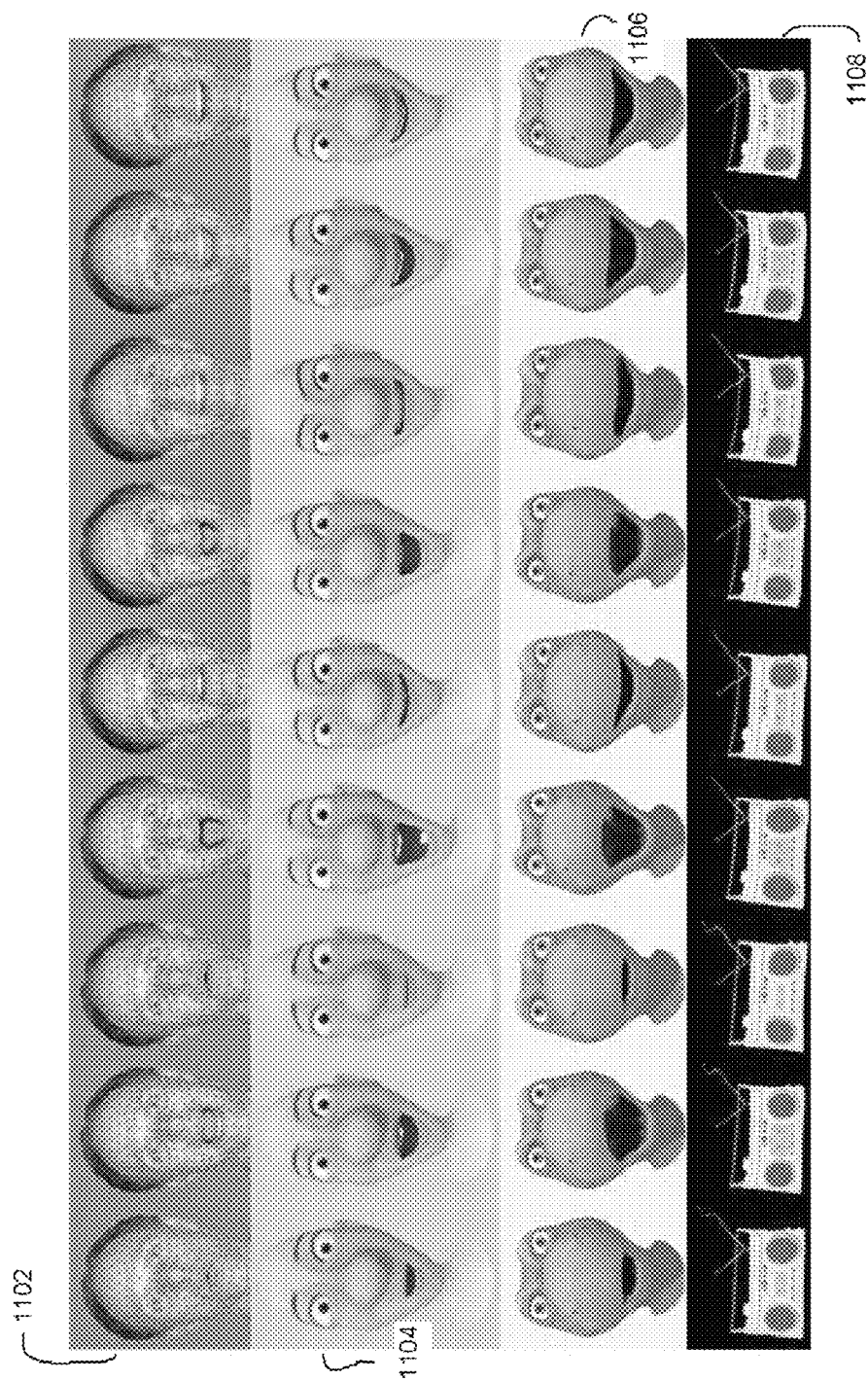

FIG. 11 illustrates input and output frames associated with retargeting a facial expression to target characters having distinct facial structures, according to one embodiment of the invention.

Figure 12:
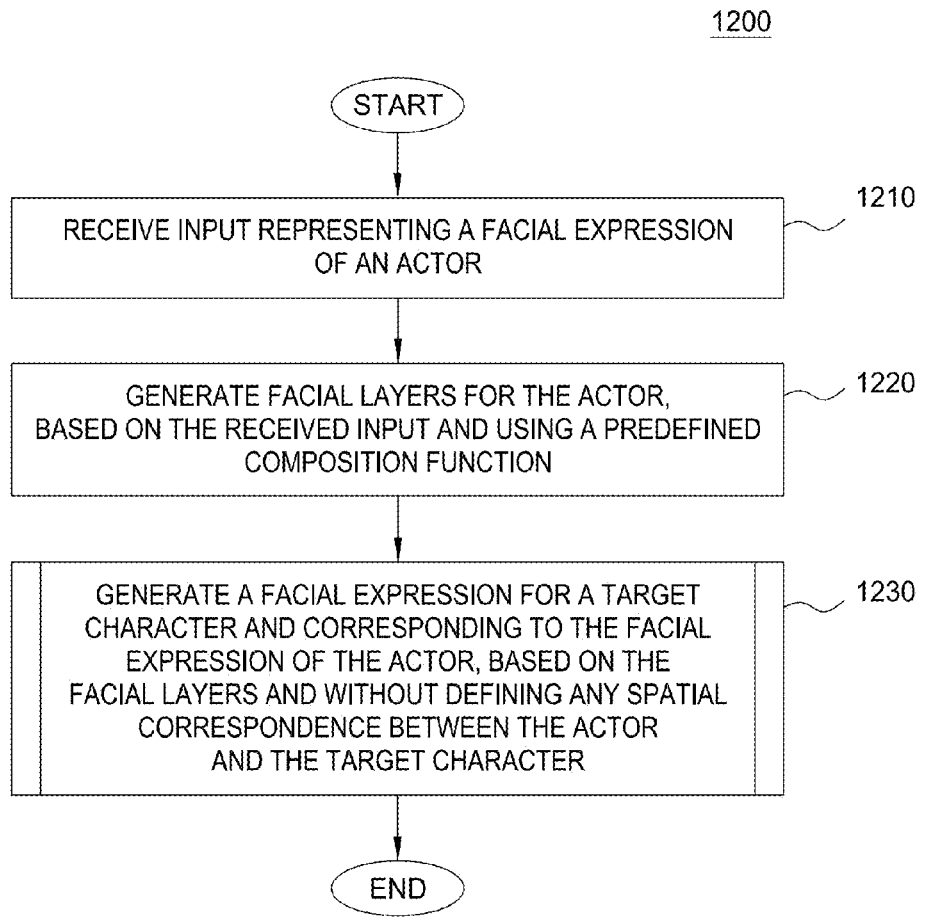

FIG. 12 is a flowchart depicting a method for retargeting facial expressions, according to one embodiment of the invention.

Figure 13:
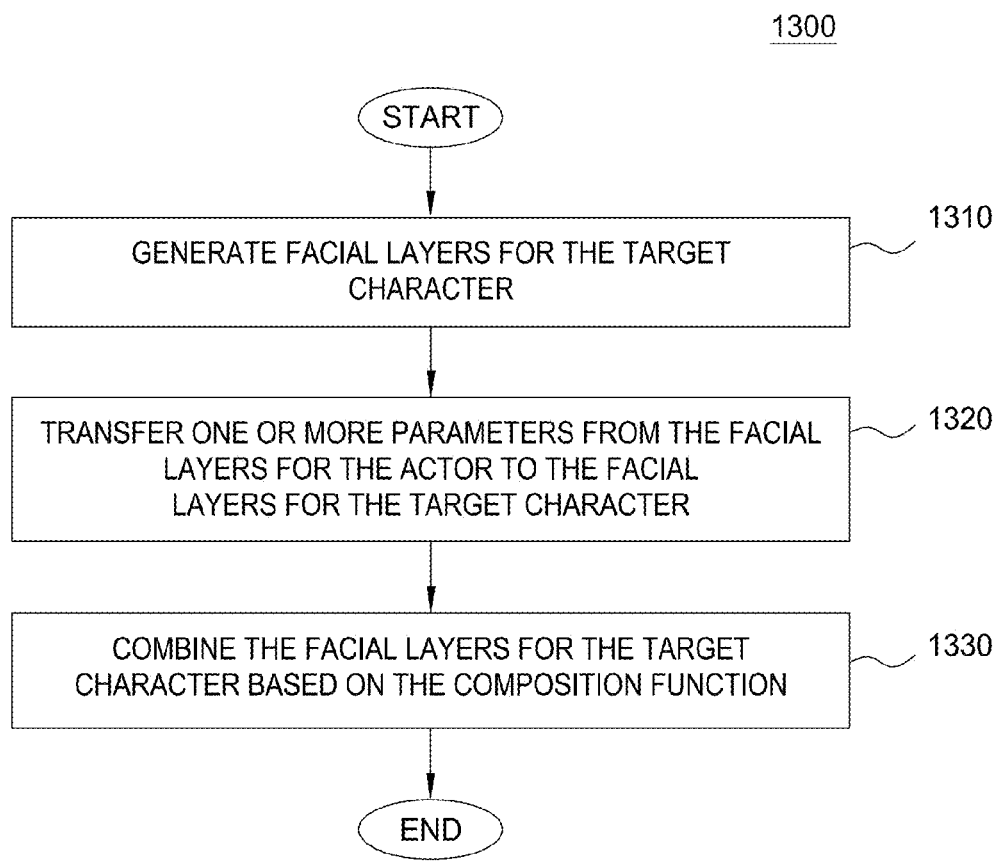

FIG. 13 is a flowchart depicting a method for generating a facial expression for a character, according to one embodiment of the invention.

DETAILED DESCRIPTION

Embodiments of the invention generally provide techniques for content retargeting using facial layers. One embodiment provides an application that receives input representing a facial expression of a first character such as a user. The application generates facial layers based on the received input and using a predefined composition function. In one embodiment, the facial layers include an emotion layer, a speech layer, and an eye-blink layer, also referred to herein as a blink layer. The application retargets the facial expression of the first character to a second character. In one embodiment, the second character is an animated character having a facial structure different than the user. The facial expression may be retargeted by generating a corresponding facial expression for the second character based on the facial layers and without defining any spatial correspondence between the first character and the second character. For example, a set of corresponding facial layers may be generated for the second character and additively combined using the predefined composition function and based on weighted masks. Accordingly, a parameter-parallel retargeting space is provided between an input facial expression and an output facial expression and via multiple facial layers. Consequently, facial expressions may be more efficiently and/or compellingly transferred to characters having arbitrary facial structure and/or expressive disposition.

In the following, reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 to retarget facial expressions, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard and/or mouse may be used. The output device 116 may be any device for providing output to a user of the computer 102. For example, the output device 116 may be any conventional display screen or set of speakers, along with their respective interface cards. Although shown separately from the input device 114, the output device 116 and input device 114 may be combined. For example, a display screen with an integrated touch-screen may be used.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a content retargeting application or related data available in the cloud. In particular, the application described herein could execute on a computing system in the cloud, thereby allowing users to access the application from any computing system attached to a network connected to the cloud (e.g., the Internet). Similarly, the retargeted facial expressions described herein could be stored in the cloud for subsequent access by users and/or applications.

As shown, the memory 106 of the computer 102 includes an application 150 configured to retarget content using facial layers. In one embodiment, the application 150 receives a source facial expression 152 of a first character such as a user. The application 150 generates a set of source facial layers 156 based on the source facial expression 152 and a composition function 154. The application 150 then generates, based on the source facial layers 156, a retargeted facial expression 158 for a second character having a different facial structure and/or expressive disposition than the first character. To this end, a set of target facial layers 157 that correspond to the source facial layers 156 may be generated. Accordingly, a parameter-parallel retargeting space may be induced between the source facial expression 152 and the retargeted facial expression 158 via the source facial layers 156 and the target facial layers 157.

At least in some embodiments, the second character may be an animated character for which the user is acting out facial expressions. Consequently, the retargeted facial expression 158 may correspond to an expression of the source facial expression 152 by the animated character. The source facial expression 152 and/or the retargeted facial expression 158 may be stored in the storage 108 of the computer 102 for subsequent access by one or more users and/or applications. Advantageously, facial expressions may be more efficiently and/or compellingly transferred to characters having any arbitrarily-defined facial structure and/or expressive disposition.

FIG. 2 illustrates examples of source and retargeted facial expressions 152, 158 of FIG. 1, according to one embodiment of the invention. As shown, the source facial expression 152 includes a facial expression 202 of a user acting expressions on behalf of one or more target characters. The retargeted facial expressions 158 include a facial expression 204 of an animated human character, a facial expression 206 of an animated tortoise character, and a facial expression 208 of an animated spherical character having an irregular number of arbitrarily arranged, human-like features. As shown, the facial expressions 204, 206, 208 of the target characters correspond to an "ecstatic" facial expression 202 of the user. The facial expressions 204, 206, 208 are generated based on the facial expression 202 of the user according to the techniques disclosed herein.

As described above, in one embodiment, the application 150 generates facial layers based on the source facial expression 152 of the first character. The facial layers may include an emotion layer, a speech layer, and an eye-blink layer. The emotion layer represents aspects of the source facial expression 152 pertaining to emotional expressions of the first character. The speech layer represents aspects of the source facial expression 152 pertaining to speaking motions of the first character. For example, such aspects may include visemes—i.e., mouth patterns corresponding to speech production. The eye-blink layer represents aspects of the source facial expression 152 pertaining to blinking motions of the first character. Each layer may also incorporate rigid head motion of the first character.

In some embodiments, the application 150 modulates the influence of each facial layer on the retargeted facial expression 158 over time and using a set of weighted masks. By doing so, the application 150 may more seamlessly generate the retargeted facial expression 158 where more than one facial layer influences the same facial region. For example, although blinking generally occurs involuntarily to irrigate the eyes, blinking can also occur due to emotions such as grief or submission. The application 150 may adjust the weights to emphasize or de-emphasize, in the retargeted facial expression 158, involuntary blinking as opposed to emotional blinking.

In some embodiments, the same composition function is used for the source and retargeted facial expressions, respectively. The composition function receives, as input, active appearance model (AAM) points for a first predefined set of features of the user representing the first character. In one embodiment, AAM refers to a computer vision algorithm for determining whether an input image matches a statistical model of shape and appearance. Additionally or alternatively, the composition function receives, as input, motion capture data for a second predefined set of features of the user. The input may be determined based on video footage of the user with motion capture markers disposed at predefined facial locations of the user. In one embodiment, the first predefined set of features includes eyes and lips of the user, and the second predefined set of features includes one or more facial features of the user, other than eyes or lips. The predefined sets of features may be tailored to suit the needs of a particular case. Further, in other embodiments, distinct composition functions are used for the source and retargeted facial expressions, respectively.

FIG. 3 is a visual depiction 300 of a technique for retargeting the source facial expression 152 of FIG. 1, according to one embodiment of the invention. As shown, the source facial expression 152 is generated from a source video frame 302 and includes AAM points and/or motion capture data. The application 150 then deconstructs the source facial expression 152 to generate the source facial layers 156, which are represented as simplicial bases $B_{Aj}$, where j represents a layer index, $j \in \{1,2,3\}$ and where A represents the actor—i.e., the user acting the expressions on behalf of the target character(s). At least in some embodiments, the application 150 may further deconstruct the source facial expression 152 into a set of predefined weights 304 that are specific to each layer. The weights 304 are represented as $W_{Aj}(t)$, where t represents time.

In one embodiment, the application 150 then generates the target facial layers 157 based on the source facial layers 156. At least in some embodiments, the source and target facial layers are further represented by simplex coefficients 306 that are common to the source and target facial layers and that are represented as $\alpha_j(t)$, where t represents time. As used herein, a simplex refers to a generalization of the notion of a triangle or tetrahedron to arbitrary dimension. In particular, an n-simplex refers to an n-dimensional polytope that is the convex hull of its n+1 vertices. Collectively, the weights 304 and the simplex coefficients 306 may be referred to herein as parameters of the facial layers. Accordingly, the generated source facial layers 156 may include parameters extracted from the source facial expression 152.

In one embodiment, each target facial layer may be generated in parallel based on the simplex coefficients and weights. The application 150 may then compose the target facial layers 157 in vertex space to generate the retargeted facial expression 158, which in this particular example is a facial expression of a tortoise character. In doing so, the target facial layers 157 may be composed in a manner that modulates the time-varying contributions of emotions, blinks, and speech. In some embodiments, the retargeted facial expression 158 is generated from the source facial expression 152 in real-time using the techniques disclosed herein. In other embodiments, retargeted facial expressions may be generated in batch mode.

In one embodiment, the simplicial bases of the facial layers form parameter-parallel retargeting spaces induced on top of the input user and output character spaces. The measurement and representation of the user and parameterization of the target character are independent of the induced simplicial bases and retargeting technique. By using a parameter-parallel approach, the application 150 may retarget facial expressions without defining any spatial correspondences between the user and the target character. Instead, users such as artists and/or actors may define correspondences that carry semantic meaning to the users. Such correspondences may also be referred to herein as semantic correspondences. Accordingly, users may more intuitively design characters that have facial features, emotions, speech patterns, and blinking patterns that bear little resemblance to those of the actor. Doing so facilitates creating a wider variety of characters with compelling emotional expressions and speech animations.

In one embodiment, the source facial expression 152 is represented as $P_1$ 3D motion capture points from the face of the user, and $P_2$ AAM points tracked from the eyes and lips of the user. These points are arranged in a vector $x_A(t) \in R^{D_A}$, where $D_A = 3P_1 + 2P_2$. The facial expression of the actor is represented in terms three facial layers: an emotion layer (j=1), a speech layer (j=2), and an eye-blink layer (j=3). The facial expression of the actor may also be further represented in terms of head motion. At any given point in time, represented by t, these facial layers form the content of the performance of the actor in the following additive compositional form:

$$x_A(t) = \tilde{R}(t)\left(x_{\mu A} + \sum_{j=1}^{3} W_{Aj}(t)B_{Aj}\alpha_j(t)\right) + \tilde{t}(t). \quad \text{(Equation 1)}$$

In Equation 1, $\tilde{R}(t)$ and $\tilde{t}(t)$ represent rotation and translation parameters of head motion, respectively, and $x_{\mu A}$ represents the actor mean. $B_{Aj}$, $j \in \{1,2,3\}$ are simplicial bases corresponding to emotion, speech, and eye-blink aspects, respectively. As described above, $\alpha_j(t)$ are simplex coefficients, and $W_{Aj}(t)$ are matrices storing weights modulating the influence of different portions of the facial layers over time.

In one embodiment, to facilitate transferring facial expressions in a parameter-parallel manner, the application 150 uses an identical compositional form for the target character:

$$x_C(t) = \tilde{R}_{3D}(t)\left(x_{\mu C} + \sum_{j=1}^{3} W_{Cj}(t)B_{Cj}\alpha_j(t)\right) + \tilde{t}_{3D}(t). \quad \text{(Equation 2)}$$

As represented in Equation 2, the character mesh is in 3D, and $x_C(t) \in R^{D_C}$ where $D_C = 3P$, where P is the number of character vertices, and where $x_{\mu C}$ represents the character mean. $\tilde{R}_{3D}(t)$ and $\tilde{t}_{3D}(t)$ are the 3D components of rotation and translation, respectively. $B_{Cj}$ are simplicial bases for the character, $W_{Cj}(t)$ are matrices storing weights of influence, and $\alpha_j(t)$ are the simplex coefficients. At least in some embodiments, the facial layer techniques of Equation 1 and 2 have a common set of underlying components, such as the same simplex coefficients $\alpha_j(t)$.

As described above, the source facial layers are represented using emotion, speech, and eye-blink simplicial bases, denoted as ($B_{A1} \in R^{D_A \times K_1}$, $B_{A2} \in R^{D_A \times K_2}$, $B_{A3} \in R^{D_A \times K_3}$). The target facial layers are also represented using emotion, speech, and eye-blink simplicial bases, denoted as ($B_{C1} \in R^{D_C \times K_1}$, $B_{C2} \in R^{D_C \times K_2}$, $B_{C3} \in R^{D_C \times K_3}$). The number of extremes in the emotion, speech, and eye-blink simplicial bases are $K_1$, $K_2$, and $K_3$, respectively. The components of each simplicial basis form a simplex. As described above, a simplex in $R^D$ refers to the simplest possible polytope in that space, where the simplex has D+1 vertices. For example, a triangle is a simplex in $R^2$, a tetrahedron is a simplex in $R^3$, etc. If a simplex is centered at one of its vertices, the remaining vertices are linearly independent.

FIG. 4 illustrates examples of simplicial bases 402, 404 for the source and target emotion layers, according to one embodiment of the invention. Layer output within each corresponding simplex is represented by barycentric coordinates of a predefined count of simplex extremes and using nonnegative barycentric coordinates that sum to one. Examples of simplex extremes include the extreme emotions of sadness, fear, disapproval, etc. The simplex of the actor has user-selected emotional expressions, and the simplex of the character has user-designed emotional expressions. For example, the selection and/or design of emotional expressions may be performed by one or more artists. Although the predefined count of twenty-nine simplex extremes has proven useful at least in some cases, the predefined count may be tailored to suit the needs of a particular case. The barycentric coordinates $\alpha_1(t)$, $\alpha_2(t)$, and $\alpha_3(t)$ of the emotion, speech, and blink simplices form the set of simplex coefficients that are common to the actor and the target character. Further, for the j-th simplex:

$$\sum_{k=1}^{K_j} \alpha_{jk}(t) = 1, \alpha_{jk}(t) \geq 0 \forall j, k. \qquad \text{(Equation 3)}$$

In one embodiment, the products $B_{Aj}\alpha_j(t)$ and $B_{Cj}\alpha_j(t)$ in Equations 1 and 2 are outputs of the j-th layer for the actor and the target character, respectively. As described above, the layer outputs for the actor and character emotion simplices ($B_{A1}$ and $B_{C1}$) are shown in FIG. 4. The non-negativity and summation-to-one constraints of each simplex provide a bound on the $L_1$-norm of the simplex coefficients. These constraints induce sparsity as opposed to other constraints such as purely nonnegative constraints. Bound constraints of non-negativity may, in some cases, activate too many coefficients, reconstructing the input with a higher margin of error as a result. Bound constraints of non-negativity may also, in some cases, combine emotions that do not plausibly occur together. The sparse constraints maintain perceptual plausibility by combining a small subset of emotions, and the sum-to-one bound keeps the motions within the span of simplex extremes.

In one embodiment, the emotion simplex includes $K_1=29$ simplex extremes from a predefined set of emotions. For example, the predefined set of emotions may include Plutchik's Wheel of Emotions. As is known, Plutchik's Wheel of Emotions refers to a set of emotions arranged in a shape of a wheel by Robert Plutchik. For instance, the predefined set of emotions may include eight primary emotions of joy, anger, sadness, surprise, disgust, fear, trust, and anticipation. The predefined set of emotions may further include three degrees of secondary emotions for each primary emotion. The predefined set of emotions may further include juncture emotions, which are disposed at the junctures of the primary emotions on the wheel.

FIG. 5 illustrates source and target facial expressions 502, 504 for the predefined set of emotions, according to one embodiment of the invention. As shown, the source and target facial expressions 502, 504 represent the emotions of ecstasy, rage, loathing, grief, amazement, terror, admiration, joy, anticipation, anger, disgust, sadness, surprise, fear, and trust. The source and target facial expressions 502, 504 further represent the emotions of apprehension, interest, annoyance, boredom, pensiveness, serenity, acceptance, love, aggressiveness, contempt, remorse, disapproval, awe, submission, and neutrality (or emotionlessness). Those skilled in the art will recognize that the count of emotions in the set, the emotions themselves, and/or the names thereof may be tailored to suit the needs of a particular case. In some embodiments, the target facial expressions are defined by an artist and are not to be confused with retargeted facial expressions, which may be programmatically generated based at least in part on the target facial expressions in such embodiments.

In one embodiment, the speech simplex includes $K_2=12$ viseme extremes, and the blink simplex includes extremes of closed eyes, open eyes, and partially open eyes, with $K_3=3$. A user may select, from video footage of the actor, specific frames for the actor simplices. Further, an artist may create the simplices for the character based solely on the emotion names and without regard to the selected frames for the actor simplices. Using the parameter-parallel approach, simplex coefficients may be transferred directly from the facial layers of the actor to the facial layers of the character.

In one embodiment, the matrices $W_{A1}(t)$, $W_{A2}(t)$, and $W_{A3}(t)$ are $D_A \times D_A$ diagonal matrices that specify the influence of the emotion, speech, and eye-blink layers $B_{Aj}\alpha_j(t)$ to each vertex of the face of the actor. The i-th row of each $W_{Aj}(t)$ weights the importance of the i-th element of each layer output $B_{Aj}\alpha_j(t)$ in generating the i-th element $x_i(t)$ of $x_A(t)$. For instance, if $x_i(t)$ is a forehead point, then at time instant t, its motion is dominated by the emotion component $B_{Aj}\alpha_j(t)$, and the diagonal of $W_{A1}(t)$ has a high value at the i-th location, while diagonals of $W_{A2}(t)$ and $W_{A3}(t)$ have low values. Mouth points include contributions from both emotion and speech, resulting in high values at their locations in diagonals of $W_{A1}(t)$ and $W_{A2}(t)$. In one embodiment, in order to conserve energy, the diagonals of $W_{Aj}(t)$ matrices may be constrained to be nonnegative and sum to 1 across j:

$$\sum_{j=1}^{3} W_{Aj}(t) = I, W_{Aj}(t) \geq 0. \qquad \text{(Equation 4)}$$

The weight matrices $W_{C1}(t)$ to $W_{C3}(t)$ similarly account for the influence of the three facial layers to the character output, and:

$$\sum_{j=1}^{3} W_{Cj}(t) = I, W_{Cj}(t) \geq 0. \qquad \text{(Equation 5)}$$

In one embodiment, because $D_A \neq D_C$ and $W_{Aj}(t) \neq W_{Cj}(t)$, the weights cannot be transferred directly from the actor to the character. Accordingly, in one embodiment, masks are used to introduce a structure on the diagonals of the weight matrices. The diagonal of the j-th actor weight matrix $W_{Aj}(t)$ can take on one of m values, $w_{j1}(t), w_{j2}(t), \ldots w_{jm}(t)$ (m=3), and m masks specify which facial points of the actor will take on each value. The l-th mask $M_{Al}$ is a $D_A \times D_A$ matrix with ones (1s) on the diagonal for points at which $W_{Aj}(t)$ has the value $w_{jl}(t)$. Similarly, for the character, the diagonal of the l-th mask $M_{Cl} \in R^{D_C \times D_C}$ has ones where $W_{Cl}(t)$ takes the value $w_{jl}(t)$.

In one embodiment, the l-th masks respectively for the actor and for the character $M_{Al}$ and $M_{Cl}$ are predefined by user input, such that points specified by the l-th mask have shared influences from a given facial layer, and such that the l-th masks respectively for the actor and for the character move similarly in the actor and in the character. In one embodiment, the actor and the animated human character each have an upper face mask, a lower face mask, and an eye mask. The animated spherical character, which has four mouths, has masks respectively corresponding to the mouths, the eyes, and the rest of the sphere (devoid of the eyes and mouth). Other embodiments are broadly contemplated without departing from the scope of the invention. For example, an animated radio character, which is illustrated in FIG. 11 described below, may have masks corresponding to a radio chassis, a cassette compartment, and speakers, respectively. Using the mask, the j-th weight matrix for the actor and the character may be expressed as:

$$W_{Aj}(t) = \sum_{l=1}^{m} w_{jl}(t) M_{Al},$$ (Equation 6)

$$W_{Cj}(t) = \sum_{l=1}^{m} w_{jl}(t),$$

$$\sum_{j=1}^{3} w_{jl}(t) \geq 0 \, \forall \, j, l.$$

Accordingly, the weight matrices may serve as weighted masks.

FIG. 6 illustrates weighted masks for the emotion layer and associated component masks for the actor and for the animated human character, respectively, according to one embodiment of the invention. At least in some embodiments, FIG. 6 corresponds to a diagrammatic representation of Equation 6. In one embodiment, the component masks are user-defined, and the weighted masks are programmatically generated from the component masks. For example, a weighted mask 602 for the actor may be generated by computing a weighted sum of component masks 606, 608, 610 for the facial regions of forehead, mouth, and eyes of the actor, respectively, where lighter shaded areas in each mask denote a marked region. The component masks for the facial regions of forehead, mouth, and eyes may be referred to herein as the forehead mask, mouth mask, and eye mask, respectively. Similarly, a weighted mask 604 for the animated tortoise character may be generated by computing a weighted sum of component masks 612, 614, 616 for the facial regions of forehead, mouth, and eyes of the animated tortoise character, respectively. The component masks, in effect, specify regions that move similarly in the actor and in the animated character. In one embodiment, the effect of the weighted masks on the layer outputs $B_{Aj}\alpha_j(t)$ for the actor and $B_{Cj}\alpha_j(t)$ for the animated tortoise character, respectively, is shown in the earlier-described FIG. 3.

In one embodiment, Equation 6 is substituted into Equations 1 and 2 to obtain the following parameter-parallel forms:

$$x_A(t) = \tilde{R}(t)\left(x_{\mu A} + \sum_{j=1}^{3}\sum_{l=1}^{m} w_{jl}(t) M_{Al} B_{Aj} \alpha_j(t)\right) + \tilde{t}(t),$$ (Equation 7)

$$x_C(t) = \tilde{R}_{3D}(t)\left(x_{\mu C} + \sum_{j=1}^{3}\sum_{l=1}^{m} w_{jl}(t) M_{Cl} B_{Cj} \alpha_j(t)\right) + \tilde{t}_{3D}(t).$$ (Equation 8)

Accordingly, the weights $w_{jl}(t)$ and the coefficients $\alpha_j(t)$ at each time step are now common between the actor and the character, and the weights and coefficients can be directly retargeted to the character. Extracting and retargeting the parameters $\tilde{R}(t)$, $\tilde{t}(t)$, $w_{jl}(t)$, and $\alpha_j(t)$ from the input data representing the actor are further described below. For notational convenience, the matrices W(t) and α(t) are additionally used and are represented as:

$$W(t) = \begin{bmatrix} w_{11}(t) & w_{21}(t) & w_{31}(t) \\ w_{12}(t) & w_{22}(t) & w_{32}(t) \\ \vdots & \vdots & \vdots \\ w_{1m}(t) & w_{2m}(t) & w_{3m}(t) \end{bmatrix},$$ (Equation 9)

$$\alpha(t) = \begin{bmatrix} \alpha_1(t) \\ \alpha_2(t) \\ \alpha_3(t) \end{bmatrix}.$$

In W(t), $w_{jl}(t)$ represents the weight by which the j-th emotion, speech, or eye-blink layer influences points specified by the l-th mask.

FIG. 7 illustrates frame sequences 702, 704 for the emotion of anger of the actor and of the animated tortoise character, respectively, according to one embodiment of the invention. The emotion layer 706, the speech layer 708, and the eye-blink layer 710 are generated from the frame sequence 702 of the actor using the techniques disclosed above. Each of the emotion layer 706, the speech layer 708, and the eye-blink layer 710 are then combined based on weighted masks to generate the frame sequence 704 of the animated tortoise character. In this particular example, when combining the weighted masks, the emotion layer is adjusted using three component masks and three associated weights. The component masks include the forehead mask, the mouth mask, and the eye mask, each having an associated weight that varies with time. The speech and eye-blink layers are similarly adjusted.

At least in some embodiments, the application 150 adjusts each facial layer based on component masks common to all facial layers and further based on weights specific to the respective facial layer, where the component masks are predefined and do not vary with time, where the weights do vary with time, and where, as described above, the weights of the same component mask type of all layers sum to one, e.g., $$\sum_{j=1}^{3} w_{jl}(t) \geq 0 \, \forall \, j, l.$$

In effect, for each component mask type, the weights specify the relative contribution from each of the emotion, speech, and eye-blink layers, masked out by the respective component mask type. Moreover, other embodiments are broadly contemplated without departing from the scope of the invention. For example, in an alternative embodiment, each facial layer is adjusted based on component masks specific to the respective facial layer. Further, one or more component masks may vary with time, while one or more other component masks may remain constant for a given frame sequence. Further still, one or more weights may also be constant with respect to time or at least remain constant for a given frame sequence.

As shown, points in the forehead region, which are masked out by $M_{C1}$, have a highest degree of influence from emotion throughout the sequence, e.g., $w_{11}(t)=1$, $w_{12}(t)=0$, and $w_{13}(t)=0$. Points in the mouth region, which are masked out by $M_{C2}$, have mixed contributions from emotion and speech and have little influence from blinking. In particular, when the actor produces a pronounced "wa", "o", or "mm" sound, the weight for the mouth mask for the speech layer, $w_{22}(t)$, increases in value. In a state of strong emotion and minimal speech, the mouth weight for the emotion layer, $w_{21}(t)$, spikes upward. Eyelid points $M_{C3}$ show mixed influence from the emotion and blink layers.

FIG. 8 shows time-varying weighted masks generated for frame sequences 802, 804 for the emotion of guilt of the actor and of the animated tortoise character, respectively, according to one embodiment of the invention. Each weighted mask is generated from combining associated component masks and respective weights, as described above. In this particular example, weighted masks 806, 808, 810 correspond to the emotion, speech, and eye-blink layers of the actor, respectively. Similarly, weighted masks 812, 814, and 816 correspond to the emotion, speech, and eye-blink layers of the animated tortoise character, respectively. The facial expression of the actor is deconstructed based on the frame sequence 802 for the actor and further based on the weighted masks 806, 808, 810. The retargeted facial expression of the animated tortoise character is generated based on the weighted masks 812, 814, 816. The retargeted facial expression is shown in the frame sequence 804 for the animated tortoise character.

In one embodiment, to extract model parameters for the facial layers, the application 150 accepts motion capture of the actor and AAM tracks of a performance as inputs. A predefined count of motion capture markers may be used to capture facial motion from the forehead, nose, cheeks, upper jaw, and lower jaw, and predefined points may be used to track eye-blinks and lip motion using AAMs. A predefined count of two-hundred and eighty-three motion capture markers, eighteen points for the eye-blinks, and twenty-two points for the lip motion have shown to be useful at least in some cases. In one embodiment, the $P_{3D}$ 3D motion capture and the $P_2$ 2D AAM tracks of the actor input $x_A$ are separately aligned to those of the mean face $x_{\mu A}$ using statistical shape analysis. One example of statistical shape analysis is Procrustes analysis, which may be used to analyze the distribution of a set of shapes. In Equation 7 given above, $\tilde{R}(t)$ and $\tilde{t}(t)$ represent parameters of head motion and may be given by:

$$\tilde{R}(t) = \begin{bmatrix} R_{3D}(t) \otimes I_{P_{3D}} & 0 \\ 0 & R_{2D}(t) \otimes I_{P_{2D}} \end{bmatrix},$$ (Equation 10)

$$\tilde{t}(t) = \begin{bmatrix} t_{3D}(t) \otimes I_{P_{3D}} \\ t_{2D}(t) \otimes I_{P_{2D}} \end{bmatrix}.$$

In Equation 10, $R_{3D}(t)$ and $R_{2D}(t)$ are 3D and 2D rotation matrices obtained from aligning motion capture and AAM tracks, respectively, and $t_{3D}(t)$ and $t_{2D}(t)$ are corresponding translations.

In one embodiment, after extracting the head motion parameters $\tilde{R}(t)$ and $\tilde{t}(t)$, the application 150 removes the effect and the mean shape from the actor data:

$$\hat{x}_A(t) = \tilde{R}(t)^{-1}(x_A(t) - \tilde{t}(t)) - x_{\mu A}.$$ (Equation 11)

In alternative embodiments, either the effect or the mean shape is removed from the actor data. In still alternative embodiments, the effect and/or the mean shape may be partially removed from the actor data. After removing the effect and/or the mean shape from the actor data, the parameters $W(t)$ and $\alpha(t)$ are extracted from $\hat{x}_A$. The parameters may be extracted by performing the following optimization:

$$(W(t)^*, \alpha(t)^*) = \operatorname{argmin}_{W(t),\alpha(t)} \left\| \hat{x}_A(t) - \sum_{j=1}^{3} \sum_{l=1}^{m} w_{jl}(t) M_{Al} B_{Aj} \alpha_j(t) \right\|^2.$$ (Equation 12)

$$s.t. \sum_{j=1}^{3} w_{jl}(t) = 1, \; w_{jl}(t) \geq 0 \; \forall \; j, l,$$

$$\sum_{k=1}^{K_j} \alpha_{jk}(t) = 1, \; \alpha_{jk}(t) \geq 0 \; \forall \; j, k$$

The optimization in Equation 12 is bilinear in $W(t)$ and $\alpha(t)$. For each frame, a local minimum is obtained using the interior point followed by one or more predefined sequential quadratic programming algorithms for constrained minima. At time t−1, the parameters are used to initialize the optimization for the frame at time t. The coefficients at the first frame are initialized randomly. At each stage, convergence is obtained when the change in function tolerance falls to below a predefined threshold. The predefined threshold value of $10^{-6}$ has proven useful at least in some cases.

FIG. 9 is a graph 900 depicting measures of root mean square reconstruction errors for a single frame sequence of the actor using the layered model as compared with using only one of the emotion, speech, and blink simplices to perform reconstruction, according to one embodiment of the invention. The measures include a first measure 902 for the layered model, a second measure 904 for the emotion simplex, a third measure 906 for the speech simplex, and a fourth measure 908 for the blink simplex. As depicted, the layered model has a measure of error for a majority of the frame sequence, compared to using only the emotion simplex. In this particular example, the highest measure of error occurs when using only the blink simplex.

In one embodiment, because lip closing is perceptually significant to achieve compelling animations, the application 150 introduces a measure of sensitivity to lip closing motions. The lip closing motions may include the motions associated with a predefined set of consonants. At least in some embodiments, the predefined set of consonants includes "p", "b", and/or "m" sounds. The application 150 may bias the weights and coefficients for the mouth mask toward the "m" viseme, e.g., $w_{21}(t)=0$, $w_{22}(t)=1$, $w_{23}(t)=0$, and $\alpha_2(t)=\alpha_{mm}$. The weights and coefficients may be biased using a first predefined smoothing factor $$\gamma = e^{-\frac{d^2}{2\sigma^2}},$$

where d is the distance between the upper and lower lips of the actor AAM. The smoothing factor is configured to bias weights and/or coefficients from the current frame to be numerically closer to the weights and/or coefficients from the previous frame in time. In some embodiments, to maintain temporal smoothness, the application 150 may additionally bias the weights and coefficients in frame t towards those in frame t−1. To this end, the application 150 may augment the minimization according to the following equation:

$$(W(t)^*, \alpha(t)^*) = \qquad \text{(Equation 13)}$$

$$argmin_{W(t),\alpha(t)} \left\| \hat{x}_A(t) - \sum_{j=1}^{3} \sum_{l=1}^{m} w_{jl}(t) M_{Al} B_{Aj} \alpha_j(t) \right\|^2 +$$

$$\frac{\gamma}{1-\gamma} \left( \left\| \begin{bmatrix} w_{21}(t) \\ w_{22}(t) \\ w_{23}(t) \end{bmatrix} - \begin{bmatrix} 0 \\ 1 \\ 0 \end{bmatrix} \right\|^2 + \right)$$
$$\|\alpha_2(t) - \alpha_{mn}(t)\|^2$$

$$\frac{\lambda}{1-\gamma} \left( \begin{array}{l} \|W(t) - W(t-1)\|_F^2 + \\ \|\alpha(t) - \alpha(t-1)\|^2 \end{array} \right) \text{s.t.}$$

$$\sum_{j=1}^{3} w_{jl}(t) = 1, w_{jl}(t) \geq 0,$$

$$\sum_{k=1}^{K_j} \alpha_{jk}(t) = 1, \alpha_{jk}(t) \geq 0$$

In Equation 13, γ is a predefined regularization factor in the form of a weighting kernel configured to influence points in the mouth region to resemble a predefined viseme for lip closure, such as "m". Further, σ is a standard deviation of the weighting kernel γ. A higher value for σ influences a greater number points around the mouth and chin regions to resemble the predefined viseme, while a lower sigma influences only points of the lip region to resemble the predefined viseme.

As described above, in one embodiment, after extracting the parameters from the inputs, the application 150 retargets the extracted parameters to the character. To facilitate the retargeting process, the application 150 applies only the rotation and translation obtained from motion capture to the 3D character mesh. In Equation 8 presented above, $\tilde{R}_{3D}(t)$ and $\tilde{t}_{3D}(t)$ are given by:

$$\tilde{R}_{3D}(t) = R_{3D}(t) \otimes 1_P, \tilde{t}_{3D}(t) = t_{3D}(t) \otimes 1_P. \qquad \text{(Equation 14)}$$

The resulting character mesh is rendered by projecting the character mesh onto a set of blendshapes created by an artist for the character.

FIG. 10 illustrates input and output frames associated with retargeting a facial expression to a target character, according to one embodiment of the invention. The frames include an input frame 1002 of a first facial expression of the actor and an output frame 1004 of a corresponding, retargeted facial expression of the target character. The frames also include an input frame 1006 of a second facial expression of the actor and an output frame 1008 of a corresponding, retargeted facial expression of the target character. In this particular example, the target character is the animated spherical character having an irregular number of humanlike features arbitrarily arranged over a sphere. In particular, the animated spherical character has five eyes, four mouths, two noses, and two ears, each feature of which may be independently posed or modeled. Retargeting facial expressions using a spatial approach—rather than using the techniques disclosed herein—may be exceedingly cumbersome, because spatial correspondences between the actor and the animated spherical character may require one-to-many mappings, which may be complex and/or difficult to define at least in some cases.

FIG. 11 illustrates input and output frames associated with retargeting a facial expression to target characters having distinct facial structures, according to one embodiment of the invention. The frames include a sequence 1102 of input frames of the actor, a sequence 1104 of retargeted output frames for the animated human character, a sequence 1106 of retargeted output frames for the animated tortoise character, and a sequence 1108 of retargeted output frames for the animated radio character. Frames on the left in FIG. 11 represent frames earlier in time than frames to the right. The frames in this particular example correspond to a frame sequence for the emotion of surprise. For example, the sequence 1102 of input frames may depict the actor expressing surprise by saying a line from a script, such as "Wow . . . I had no idea you were into that!" Counting from the left, the first three frames show visemes associated with uttering "Wow". The next five frames show visemes associated with uttering, respectively, "I", "o" in "no", "i" in "idea", "e" in "idea", and "a" of "that". The rightmost frame shows an ending facial expression of a smile.

In one embodiment, using the techniques disclosed herein, the application 150 captures the interested facial expression of the actor as the actor utters the word "idea", including facial features such as knotted eyebrows. In the sequence 1108 of retargeted output frames for the animated radio character, mouth motion of the actor is mapped to movement of the cassette compartment of the animated radio character. Further, the chassis of the animated radio character curves upward to convey the emotion of happiness, as shown in the rightmost frame for the animated radio character. The chassis also expands to convey the emotion of excitement, as shown in the fourth frame for the animated radio character, from the left. In retargeting facial expressions for various sentences using the techniques disclosed herein, the factor settings of σ=0.005 and λ=0.05 for the animated human character and the factor settings of σ=0.02 and λ=0.2 for all other characters have proven useful at least in some cases.

Accordingly, techniques are disclosed herein for retargeting facial expressions to a variety of characters with distinct, arbitrary-defined facial structures. Coefficients of simplicial bases for emotion, speech, and blink layers are transferred from a source set of facial layers to a target set of facial layers. Time-varying weights may also be used to specify the influence of distinct, predefined facial regions of each layer. Under the parameter-parallel approach disclosed herein, the resulting animations capture the expressiveness of the performance of the actor as depicted in the input frame sequence and in a distinctive style designed by the artist of each respective target character. To this end, the space of facial expression is spanned in a semantically meaningful way that allows an artist to define the space for retargeting. Thus, animations may be produced onto which viewers may plausibly project the content of the performance of the actor. The simplex provides a sparse set of coefficients that captures the most meaningful simplex vertices towards the emotion, speech, and blink content of a given facial expression. By combining a narrow set of simplex vertices, the simplex facilitates generating perceptually plausible emotional content in produced animation sequences.

Further, using the techniques disclosed herein, facial expressions may be retargeted by parameter transfer and without transferring facial motion over common elementary units of motion defined between the source and target characters and without transferring facial deformations based on spatial correspondences defined between the source and target characters. Further still, facial expressions may be retargeted without performing mesh deformation. Mesh deformation includes computing deformations of the geometry of a source mesh with respect to a base mesh and spatially mapping the computed deformation in order to deform a target base mesh through initial vertex correspondences. Using the techniques disclosed herein, facial expressions may be determined and transferred from an actor to a character.

As described above, in one embodiment, a layered model is provided to capture subtleties of emotions, speech, and eye-blinks, and time-varying weights are provided to modulate the parameters. For example, the weights may define the contributions of the emotion, speech, and blink layers to the final facial output at different points on the face. The weights allow a wide range of facial motions to be represented with a concise basis of semantically meaningful facial poses. For each layer in the model, a parameter-parallel retargeting space is induced in terms of semantically significant simplices of emotion, speech, and eye-blinks. At least in some embodiments, the layered model additively combines outputs of emotion, speech, and blink layers using weighted masks. Doing so may prevent or reduce undesirable cross-talk between emotion and speech at least in some cases. Further, the emotion and speech layers provide respective contributions to the final facial expression, as determined by respective weighted influences. In alternative embodiments, the emotion, speech, and blink layers are combined multiplicatively and/or cross-talk between emotion and speech is assumed.

In one embodiment, the layered model allows facial expressions to be transferred through a basis that is interpretable by both the actor and the character artist. Transferring expressions via a Facial Action Coding System (FACS) basis may be challenging in some cases, because doing so may require the actor to perform locally isolated motions to define the mapping. FACS refers to a system arranging human facial expressions into a predefined taxonomy. Further, even mesh deformation techniques may not necessarily apply to characters with facial morphologies deviating considerably from the human face. It may be perceptually challenging for users attuned to facial expressions of human characters, to evaluate the animation quality of non-anthropomorphic characters such as the animated radio character and the animated spherical character described herein. Nevertheless, the techniques disclosed herein may be used to convey the emotions provided by the artist while maintaining speech patterns that are compelling to viewers.

In embodiments where the previous frame at time t−1 is taken into account, the approach is first order Markovian and may be implemented in real-time. In alternative embodiments, multiple previous frames may be taken into account and processed in either real-time or batch mode. Further, where Procrustes alignment is used with respect to the $L_2$-norm for rigid bodies to compute rotation and translation for head motion, excessive non-rigid motion may dominate the alignment procedure and provide an incorrect rigid estimate. Further still, the simplex structure best captures the motion on the simplex boundary and within the simplex interior. Motions outside simplex extremes may be truncated to projections onto the simplex boundary. At least in some embodiments, expected inputs include natural actor performances and the extremes of emotion, speech, and blinks as a basis.

FIG. 12 is a flowchart depicting a method 1200 for retargeting facial expressions, according to one embodiment of the invention. As shown, the method 1200 begins at step 1210, where the application 150 receives input representing a facial expression of a first character. At step 1220, the application 150 generates facial layers for the first character, based on the received input and using a predefined composition function. The facial layers may include one or more parameters extracted from the received input. At step 1230, the application generates a facial expression for a second character and corresponding to the facial expression of the first character. The facial expression is generated based on the facial layers and without defining any spatial correspondence between the first character and the second character. The step 1230 is further described in conjunction with FIG. 13. Accordingly, the application 150 induces a parameter-parallel retargeting space between the input facial expression and the output facial expression and via the facial layers. After the step 1230, the method 1200 terminates.

FIG. 13 is a flowchart depicting a method 1300 for generating a facial expression for the second character, according to one embodiment of the invention. The method 1300 corresponds to the step 1230 of FIG. 12. As shown, the method 1300 begins at step 1310, where the application 150 generates a set of facial layers for the second character, corresponding to the facial layers for the first character. At step 1320, the application 150 transfers the one or more parameters from the facial layers for the first character to the facial layers for the second character. At step 1330, the application 150 combines the facial layers for the second character based on the composition function, to generate the facial expression for the second character. In some embodiments, the facial layers for the second character are additively combined based on weighted masks. After the step 1330, the method 1300 terminates.

Advantageously, embodiments of the invention provide techniques to retarget facial expressions by providing a parameter-parallel retargeting space between an input facial expression and an output facial expression and via multiple facial layers. One embodiment provides an application configured to receive input representing a facial expression of a first character. The application is further configured to generate facial layers for the first character based on the received input. The application is further configured to generate a facial expression for a second character based on the facial layers, where the facial expression for the second character corresponds to the facial expression of the first character. Accordingly, facial expressions may be more efficiently and/or compellingly transferred to target characters having any arbitrarily defined facial structure and/or expressive disposition. Further, facial expressions may be transferred without defining any spatial correspondence between source and target characters.

While the foregoing is directed to embodiments of the present invention, other and further embodiments of the invention may be devised without departing from the basic scope thereof, and the scope thereof is determined by the claims that follow.

What is claimed is:

1. A computer-implemented method to retarget facial expressions by providing a parameter-parallel retargeting space between an input facial expression and an output facial expression and via a plurality of facial layers, the computer-implemented method comprising:

receiving input representing a facial expression of a first character;

generating a plurality of facial layers for the first character, based on the received input and a composition function and by operation of one or more computer processors, wherein the plurality of facial layers includes a plurality of parameters extracted from the received input, the plurality of parameters including a simplex coefficient common to the plurality of facial layers and weighted by a respective measure of influence for each of the plurality of facial layers; wherein the simplex coefficient is extracted by an optimization operation that includes determining a set of inputs for which a given function attains a minimum value, wherein the optimization operation is subject to a set of constraints and is based on a sequential quadratic programming algorithm; wherein each facial layer encodes, in a simplicial basis, one or more semantically significant aspects of the facial expression of the first character; and wherein a simplex is formed from components of each simplicial basis; and generating, for a second character different from the first character in appearance, a facial expression corresponding to the facial expression of the first character, based on the plurality of facial layers.

2. The computer-implemented method of claim 1, wherein the facial expression for the second character includes a plurality of facial features of the second character, wherein each of the plurality of facial features is modeled independently based on the plurality of facial layers.

3. The computer-implemented method of claim 2, wherein the plurality of parameters spans a space of facial expression.

4. The computer-implemented method of claim 3, wherein the space of facial expression comprises a predetermined association of each of a plurality of different facial expressions with a distinct emotion corresponding to the respective facial expression.

5. The computer-implemented method of claim 4, wherein the parameter-parallel retargeting space is induced, wherein generating the facial expression for the second character comprises:

generating a plurality of facial layers for the second character;

transferring the plurality of parameters from the plurality of facial layers for the first character to the plurality of facial layers for the second character; and combining the plurality of facial layers for the second character based on the composition function.

6. A computer program product to retarget facial expressions by providing a parameter-parallel retargeting space between an input facial expression and an output facial expression and via a plurality of facial layers, the computer program product comprising:

a non-transitory computer-readable medium having computer-readable program code embodied therewith, the computer-readable program code executable by one or more computer processors to:

receive input representing a facial expression of a first character;

generate a plurality of facial layers for the first character, based on the received input and a composition function, wherein the plurality of facial layers includes a plurality of parameters extracted from the received input, the plurality of parameters including a simplex coefficient common to the plurality of facial layers and weighted by a respective measure of influence for each of the plurality of facial layers; wherein the simplex coefficient is extracted by an optimization operation that includes determining a set of inputs for which a given function attains a minimum value, wherein the optimization operation is subject to a set of constraints and is based on a sequential quadratic programming algorithm; wherein each facial layer encodes, in a simplicial basis, one or more semantically significant aspects of the facial expression of the first character; and wherein a simplex is formed from components of each simplicial basis; and generate, for a second character different from the first character in appearance, a facial expression corresponding to the facial expression of the first character, based on the plurality of facial layers.

7. The computer program product of claim 6, wherein the facial expression for the second character includes a plurality of facial features of the second character, wherein each of the plurality of facial features is modeled independently based on the plurality of facial layers.

8. The computer program product of claim 7, wherein the plurality of parameters spans a space of facial expression.

9. The computer program product of claim 8, wherein the space of facial expression comprises a predetermined association of each of a plurality of different facial expressions with a distinct emotion corresponding to the respective facial expression.

10. The computer program product of claim 9, wherein the parameter-parallel retargeting space is induced, wherein the computer-readable program code is further executable to:

generate a plurality of facial layers for the second character;

transfer the plurality of parameters from the plurality of facial layers for the first character to the plurality of facial layers for the second character; and combine the plurality of facial layers for the second character based on the composition function.

11. A system to retarget facial expressions by providing a parameter-parallel retargeting space between an input facial expression and an output facial expression and via a plurality of facial layers, the system comprising:

one or more computer processors;

a memory containing a program which, when executed by the one or more computer processors, is configured to perform an operation comprising:

receiving input representing a facial expression of a first character;

generating a plurality of facial layers for the first character, based on the received input and a composition function, wherein the plurality of facial layers includes a plurality of parameters extracted from the received input, the plurality of parameters including a simplex coefficient common to the plurality of facial layers and weighted by a respective measure of influence for each of the plurality of facial layers; wherein the simplex coefficient is extracted by an optimization operation that includes determining a set of inputs for which a given function attains a minimum value, wherein the optimization operation is subject to a set of constraints and is based on a sequential quadratic programming algorithm; wherein each facial layer encodes, in a simplicial basis, one or more semantically significant aspects of the facial expression of the first character; and wherein a simplex is formed from components of each simplicial basis; and generating, for a second character different from the first character in appearance, a facial expression corresponding to the facial expression of the first character, based on the plurality of facial layers.

12. The system of claim 11, wherein the facial expression for the second character includes a plurality of facial features of the second character, wherein each of the plurality of facial features is modeled independently based on the plurality of facial layers.

13. The system of claim 12, wherein the plurality of parameters spans a space of facial expression.

14. The system of claim 13, wherein the space of facial expression comprises a predetermined association of each of a plurality of different facial expressions with a distinct emotion corresponding to the respective facial expression.

15. The system of claim 14, wherein the parameter-parallel retargeting space is induced, wherein generating the facial expression for the second character comprises:
  generating a plurality of facial layers for the second character;
  transferring the plurality of parameters from the plurality of facial layers for the first character to the plurality of facial layers for the second character; and
  combining the plurality of facial layers for the second character based on the composition function.

16. The system of claim 15, wherein the facial expression for the second character is generated without defining any spatial correspondence between the first character and the second character;
  wherein the first character comprises one of a user and a first animated character, wherein the second character comprises a second animated character, and wherein the second character has a different facial structure than the first character.

17. The system of claim 16, wherein at least one plurality of facial layers includes at least one of an emotion layer, a speech layer, and an eye-blink layer, wherein the respective measure of influence for each of the plurality of facial layers is distinct.

18. The system of claim 17, wherein each plurality of facial layers includes the emotion layer, the speech layer, and the eye-blink layer, wherein the plurality of facial layers for the first character and the plurality of facial layers for the second character are parameter-parallel;
  wherein the emotion layer represents aspects of the facial expression relating to emotion, wherein the speech layer represents aspects of the facial expression relating to speech, and wherein the eye-blink layer represents aspects of the facial expression relating to blinking, and wherein the facial layers for the second character are additively combined using the composition function and based on a plurality of weighted masks.

19. A system to retarget facial expressions by providing a parameter-parallel retargeting space between an input facial expression and an output facial expression and via a plurality of facial layers, the system comprising:
  one or more computer processors;
  a memory containing a program which, when executed by the one or more computer processors, is configured to perform an operation comprising:
    receiving input representing a facial expression of a first character, wherein the received input includes a plurality of points of the facial expression of the first character;
    generating a plurality of facial layers for the first character, based on the received input and a composition function, wherein the first character comprises one of a user and a first animated character, wherein the plurality of facial layers includes a plurality of parameters extracted from the received input, the plurality of parameters including a simplex coefficient common to the plurality of facial layers and weighted by a respective, distinct measure of influence for each of the plurality of facial layers, wherein the simplex coefficient is extracted by an optimization operation based on a predefined algorithm and that includes determining a set of inputs for which a given function attains a minimum value, wherein the plurality of parameters spans a space of facial expression, wherein each facial layer encodes, in a simplicial basis, one or more semantically significant aspects of the facial expression of the first character, wherein a simplex is formed from components of each simplicial basis, wherein the space of facial expression comprises a predetermined association of each of a plurality of different facial expressions with a distinct emotion corresponding to the respective facial expression, wherein generating the plurality of facial layers for the first character comprises:
      generating a first vector from the plurality of points of the facial expression of the first character;
      generating, for a second character different from the first character in appearance, a second vector representing a facial expression for the second character, that corresponds to the facial expression of the first character, wherein the second character comprises a second animated character, and wherein the second character has a different facial structure than the first character:
      designating a set of simplex coefficients common to emotion, speech, and eye-blink layers of each of the first and second characters, wherein the emotion layer represents aspects of the facial expression relating to emotion, wherein the speech layer represents aspects of the facial expression relating to speech, wherein the eye-blink layer represents aspects of the facial expression relating to blinking; and
      designating measures of influence of the emotion, speech, and eye-blink facial layers, respectively, of which each measure of influence is represented in the form of a diagonal matrix that is used to weight a respective one of the emotion, speech, and eye-blink facial layers; and
    generating, for the second character and based on the plurality of facial layers, the facial expression that corresponds to the facial expression of the first character, without defining any spatial correspondence between the first character and the second character, wherein the facial expression for the second character includes a plurality of facial features of the second character, wherein each of the plurality of facial features is modeled independently based on the plurality of facial layers, wherein generating the facial expression for the second character comprises:
      generating a plurality of facial layers for the second character, wherein each plurality of facial layers includes an emotion layer, a speech layer, and an eye-blink layer, wherein the plurality of facial layers for the first character and the plurality of facial layers for the second character are parameter-parallel, wherein the parameter-parallel retargeting space is induced;
      transferring the plurality of parameters from the plurality of facial layers for the first character to the plurality of facial layers for the second character; and
      additively combining the plurality of facial layers for the second character based on the composition function and based on a plurality of weighted masks.

20. The system of claim 19, wherein the optimization operation is subject to a set of constraints, wherein the given function includes a norm of a vector difference between: (i) a mean shape from the received input and (ii) a summation of vector products of: measures of influence, component masks, simplicial bases, and simplex coefficients; wherein the algorithm comprises a sequential quadratic programming algorithm, wherein each simplex is represented by barycentric coordinates of a predefined count of simplex extremes and using nonnegative barycentric coordinates that sum to one;

wherein each diagonal matrix is masked, wherein generating the plurality of facial layers for the first character further comprises extracting the plurality of parameters from the received input, wherein generating the facial expression for the second character includes retargeting the plurality of parameters from the first character to the second character, wherein the received input includes motion capture data and active appearance model (AAM) tracks, wherein the operation further comprises:

aligning the motion capture data and AAM tracks from the received input, in order to extract a head motion rotation parameter and a corresponding head motion translation parameter.

21. The system of claim 20, wherein the composition function comprises the given function, wherein the one or more semantically significant aspects of the facial expression of the first character are encoded in emotion, speech, and blink simplices, wherein each of the emotion, speech, and blink simplices is represented by respective, barycentric coordinates, wherein the barycentric coordinates of the emotion, speech and blink simplices constitute a set of simplex coefficients that are common to the first character and the second character;

wherein the plurality of parameters includes the set of simplex coefficients, the head motion rotation parameter, and the head motion translation parameter, wherein each of the first character and the second character are associated with a respective plurality of component masks including an upper face mask, a lower face mask, and an eye mask, wherein each mask introduces structure on diagonals of weight matrices containing measures of influence for the plurality of facial layers, wherein the operation further comprises:

subsequent to extracting the head motion rotation and translation parameters, removing a corresponding effect and mean shape from the received input in order to determine an intermediate expression, whereafter the measures of influence and the set of simplex coefficients are extracted from the intermediate expression;

applying a predefined smoothing factor to the optimization operation in order to facilitate temporal smoothness of the facial expression for the second character; and retargeting the extracted parameters of the first character, to the second character, by applying rotation and translation from the motion capture data, to a 3D character mesh of the second character.

22. The system of claim 21, wherein the first vector is given by a first predefined equation comprising:

$$x_A(t) = \tilde{R}(t)\left(x_{\mu A} + \sum_{j=1}^{3} W_{Aj}(t) B_{Aj} \alpha_j(t)\right) + \tilde{t}(t);$$

wherein the second vector is given by a second predefined equation comprising:

$$x_C(t) = \tilde{R}_{3D}(t)\left(x_{\mu C} + \sum_{j=1}^{3} W_{Cj}(t) B_{Cj} \alpha_j(t)\right) + \tilde{t}_{3D}(t);$$

wherein the set of simplex coefficients is given by a third predefined equation comprising:

$$\sum_{k=1}^{K_j} \alpha_{jk}(t) = 1, \alpha_{jk}(t) \geq 0 \forall j, k;$$

wherein separate measures of influence are specified for the first and second characters, respectively, wherein diagonals of each diagonal matrix of the first character is constrained to be nonnegative and further constrained according to a fourth predefined equation given by:

$$\sum_{j=1}^{3} W_{Aj}(t) = I, W_{Aj}(t) \geq 0;$$

wherein diagonals of each diagonal matrix for the second character is constrained to be nonnegative and further constrained according to a fifth predefined equation given by:

$$\sum_{j=1}^{3} W_{Cj}(t) = I, W_{Cj}(t) \geq 0.$$

23. The system of claim 22, wherein the diagonal matrices are masked according to a sixth predefined equation given by:

$$W_{Aj}(t) = \sum_{l=1}^{m} w_{jl}(t) M_{Al}, W_{Cj}(t) = \sum_{l=1}^{m} w_{jl}(t), \sum_{j=1}^{3} w_{jl}(t) \geq 0 \forall j, l;$$

wherein the sixth predefined equation is substitutable into the first and second predefined equations in order to obtain seventh and eighth predefined equations given by, respectively:

$$x_A(t) = \tilde{R}(t)\left(x_{\mu A} + \sum_{j=1}^{3}\sum_{l=1}^{m} w_{jl}(t) M_{Al} B_{Aj} \alpha_j(t)\right) + \tilde{t}(t); \text{ and}$$

$$x_C(t) = \tilde{R}_{3D}(t)\left(x_{\mu C} + \sum_{j=1}^{3}\sum_{l=1}^{m} w_{jl}(t) M_{Cl} B_{Cj} \alpha_j(t)\right) + \tilde{t}_{3D}(t);$$

wherein the extracted plurality of parameters are represented in the form of matrices given by a ninth predefined equation comprising:

$$W(t) = \begin{bmatrix} w_{11}(t) & w_{21}(t) & w_{31}(t) \\ w_{12}(t) & w_{22}(t) & w_{32}(t) \\ \vdots & \vdots & \vdots \\ w_{1m}(t) & w_{2m}(t) & w_{3m}(t) \end{bmatrix}, \alpha(t) = \begin{bmatrix} \alpha_1(t) \\ \alpha_2(t) \\ \alpha_3(t) \end{bmatrix};$$

wherein the head motion rotation parameter and the corresponding head motion translation parameter are given by tenth predefined equation comprising:

$$\tilde{R}(t) = \begin{bmatrix} R_{3D}(t) \otimes I_{P_{3D}} & 0 \\ 0 & R_{2D}(t) \otimes I_{P_{2D}} \end{bmatrix}, \tilde{t}(t) = \begin{bmatrix} t_{3D}(t) \otimes I_{P_{3D}} \\ t_{2D}(t) \otimes I_{P_{2D}} \end{bmatrix}.$$

24. The system of claim 23, wherein the corresponding effect and mean shape are removed according to an eleventh predefined equation given by:

$$\hat{x}_A(t) = \tilde{R}(t)^{-1}(x_A(t) - \tilde{t}(t)) - x_{\mu A}.$$

wherein the plurality of parameters are extracted according to the optimization operation, wherein the optimization operation is given by a twelfth predefined equation comprising:

$$(W(t)^*, \alpha(t)^*) = \mathrm{argmin}_{W(t),\alpha(t)} \left\| \hat{x}_A(t) - \sum_{j=1}^{3} \sum_{l=1}^{m} w_{jl}(t) M_{Al} B_{Aj} \alpha_j(t) \right\|^2$$

$$\mathrm{s.t.} \sum_{j=1}^{3} w_{jl}(t) = 1, w_{jl}(t) \geq 0 \,\forall\, j, l, \sum_{k=1}^{K_j} \alpha_{jk}(t) = 1, \alpha_{jk}(t) \geq 0 \,\forall\, j, k;$$

wherein the smoothing factor is applied to the optimization operation by augmenting the optimization operation according to a thirteenth predefined equation comprising:

$$(W(t)^*, \alpha(t)^*) = \mathrm{argmin}_{W(t),\alpha(t)} \left\| \hat{x}_A(t) - \sum_{j=1}^{3} \sum_{l=1}^{m} w_{jl}(t) M_{Al} B_{Aj} \alpha_j(t) \right\|^2 +$$

$$\frac{\gamma}{1-\gamma} \left( \left\| \begin{bmatrix} w_{21}(t) \\ w_{22}(t) \\ w_{23}(t) \end{bmatrix} - \begin{bmatrix} 0 \\ 1 \\ 0 \end{bmatrix} \right\|^2 + \|\alpha_2(t) - \alpha_{mm}(t)\|^2 \right) +$$

$$\frac{\lambda}{1-\gamma} (\|W(t) - W(t-1)\|_F^2 + \|\alpha(t) - \alpha(t-1)\|^2)$$

$$\mathrm{s.t.} \sum_{j=1}^{3} w_{jl}(t) = 1, w_{jl}(t) \geq 0, \sum_{k=1}^{K_j} \alpha_{jk}(t) = 1, \alpha_{jk}(t) \geq 0;$$

wherein the rotation and translation applied to the 3D character mesh of the second character are given by a fourteenth predefined equation comprising:

$$\tilde{R}_{3D}(t) = R_{3D}(t) \otimes I_P, \tilde{t}_{3D}(t) = t_{3D}(t) \otimes 1_P.$$

* * * * *

UNITED STATES PATENT AND TRADEMARK OFFICE
CERTIFICATE OF CORRECTION

PATENT NO. : 9,245,176 B2  
APPLICATION NO. : 13/564476  
DATED : January 26, 2016  
INVENTOR(S) : Matthews et al.

Page 1 of 1

It is certified that error appears in the above-identified patent and that said Letters Patent is hereby corrected as shown below:

Specification  
In the Detailed Description:  
Column 15, Line 29, please delete "a influences" and insert --$\sigma$ influences-- therefor.

Signed and Sealed this  
Twenty-sixth Day of April, 2016

Michelle K. Lee  
*Director of the United States Patent and Trademark Office*